United States Patent [19]
Kibe et al.

[11] Patent Number: 5,983,630
[45] Date of Patent: Nov. 16, 1999

[54] FUEL INJECTING DEVICE FOR AN ENGINE

[75] Inventors: Kazuya Kibe; Masato Gotoh, both of Susono; Tatsuji Mizuno, Yokohama; Ichiro Sakata, Susono, all of Japan

[73] Assignee: Toyota Jidosha Kabushiki Kaisha, Toyota, Japan

[21] Appl. No.: 09/106,269

[22] Filed: Jun. 29, 1998

[30]      Foreign Application Priority Data

| Jul. 1, 1997 | [JP] | Japan | 9-175990 |
| Jul. 8, 1997 | [JP] | Japan | 9-182592 |
| Jul. 31, 1997 | [JP] | Japan | 9-206829 |
| Oct. 21, 1997 | [JP] | Japan | 9-288566 |
| Oct. 21, 1997 | [JP] | Japan | 9-288682 |
| Oct. 30, 1997 | [JP] | Japan | 9-298766 |

[51] Int. Cl.$^6$ ............... F01N 3/36; F02D 41/38
[52] U.S. Cl. ............. 60/285; 123/300; 123/305
[58] Field of Search ................. 123/299, 300, 123/305, 568.21; 60/276, 284, 285, 286, 301

[56]           References Cited

U.S. PATENT DOCUMENTS

| 5,207,058 | 5/1993 | Sasaki et al. | 60/284 |
| 5,720,253 | 2/1998 | Matoba et al. | 123/305 X |

FOREIGN PATENT DOCUMENTS

| 4-187815 | 7/1992 | Japan . |
| 6-117225 | 4/1994 | Japan . |
| 7-103013 | 4/1995 | Japan . |
| 8-42326 | 2/1996 | Japan . |
| 8-232743 | 9/1996 | Japan . |
| 8-261052 | 10/1996 | Japan . |
| 8-270433 | 10/1996 | Japan . |
| 9-68072 | 3/1997 | Japan . |

*Primary Examiner*—Tony M. Argenbright
*Attorney, Agent, or Firm*—Oliff & Berridge, PLC

[57]           ABSTRACT

According to the present invention, there is provided a fuel injecting device for injecting fuel into a cylinder of an engine. A fuel injector injects a main fuel charge into the cylinder at a predetermined first timing, and the fuel injector injects additional fuel into the cylinder at a predetermined second timing which is different from the predetermined first timing. It is judged if an amount of fuel adhering to an inner wall of the cylinder is larger than a predetermined fuel amount when the fuel injector injects the additional fuel. The fuel injector inject the additional fuel such that an amount of fuel adhering to the inner wall of the cylinder becomes smaller than the predetermined fuel amount when it is judged that an amount of fuel adhering to the inner wall of the cylinder is larger than the predetermined fuel amount.

27 Claims, 29 Drawing Sheets

FUEL INJECTING DEVICE FOR AN ENGINE

BACKGROUND OF THE INVENTION

1. Field of the Invention

The invention relates to a fuel injecting device for an engine.

2. Description of the Related Art

In the engine field, it is known that an injection of fuel into a cylinder of the engine (hereinafter referred to as "pilot injection") is operated to decrease an amount of the $NO_X$ and noises generated in the engine before an injection of fuel into a cylinder is operated to drive the engine. When the fuel is injected into the cylinder by the pilot injection, the fuel is burned in the cylinder to increase a temperature in the cylinder.

Further, as disclosed in Japanese Unexamined Patent Publication (Kokai) No. 8-261052, it is known that an injection of fuel into a cylinder of the engine (hereinafter referred to as "post injection") is operated to feed the fuel as reducing agent to a catalyst for purifying an exhaust gas after an injection of the fuel into the cylinder is operated to drive the engine. The catalyst purifies the NOx included in the exhaust gas with the reducing agent. When the fuel is injected into the cylinder by the post injection, the fuel evaporates in the cylinder and is discharged from the cylinder as the evaporated fuel.

However, if a temperature in the cylinder is lower than a predetermined temperature when a predetermined amount of the fuel is injected into the cylinder by the pilot or post injection, a certain amount of the fuel may adhere to an inner wall of the cylinder. The fuel adhering to the inner wall of the cylinder may pass through the clearance formed between the inner wall of the cylinder and a piston inserted into the cylinder. Therefore, the temperature in the cylinder cannot be increased to an intended temperature in connection with the pilot injection. Also, an intended amount of the fuel cannot be fed to the catalyst to purify the exhaust gas.

Further, in the case that an engine oil for lubricating parts of the engine is provided under a piston inserted in the cylinder, when the fuel adhering to the inner wall of the cylinder may pass through the clearance formed between the inner wall of the cylinder and the piston, the engine oil is deteriorated.

Therefore, the object of the invention is to provide a fuel injecting device for an engine which can inject the fuel into the cylinder without the adhering of the fuel to the inner wall of the cylinder.

SUMMARY OF THE INVENTION

According to the invention, there is provided a fuel injecting device for injecting fuel into a cylinder of an engine, comprising: fuel injecting means for injecting a main fuel charge into the cylinder at a predetermined first timing, and the fuel injecting means injects additional fuel into the cylinder at a predetermined second timing which is different from the predetermined first timing;

judging means for judging if an amount of fuel adhering to an inner wall of the cylinder is larger than a predetermined fuel amount when the fuel injecting means injects the additional fuel; and control means for controlling an operation of the fuel injecting means to inject the additional fuel such that an amount of fuel adhering to the inner wall of the cylinder becomes smaller than the predetermined fuel amount when the judging means judges that an amount of fuel adhering to the inner wall of the cylinder is larger than the predetermined fuel amount.

Further, according to the invention, the predetermined second timing is earlier than the predetermined first timing.

Further, according to the invention, the predetermined second timing is later than the predetermined first timing, and a catalyst for purifying exhaust gas discharged from the cylinder with the fuel is provided in an exhaust passage.

Further, according to the invention, the additional fuel is burned to increase the temperature of the catalyst.

Further, according to the invention, the catalyst purifies the exhaust gas with the additional fuel when the exhaust gas includes excess oxygen therein.

Further, according to the invention, the judging means judges that an amount of fuel adhering to the inner wall of the cylinder is larger than the predetermined fuel amount when the judging means judges that an amount of the fuel evaporating from the inner wall of the cylinder is smaller than a predetermined fuel evaporating amount.

Further, according to the invention, the judging means judges that an amount of the fuel evaporating from the inner wall of the cylinder is smaller than the predetermined fuel evaporating amount when the judging means judges that the temperature of the inner wall of the cylinder is lower than a predetermined inner wall temperature.

Further, according to the invention, the judging means judges that an amount of the fuel evaporating from the inner wall of the cylinder is smaller than the predetermined fuel evaporating amount when the judging means judges that an amount of the main fuel charge is smaller than a predetermined main fuel charge amount.

Further, according to the invention, the judging means judges that an amount of fuel adhering to the inner wall of the cylinder is larger than the predetermined fuel amount when the judging means judges that an amount of the fuel evaporating when the additional fuel flows into the cylinder is smaller than a predetermined fuel evaporating amount.

Further, according to the invention, the judging means judges than an amount of the fuel evaporating when the additional fuel flows into the cylinder is smaller than the predetermined fuel evaporating amount when the judging means judges that the pressure of the injection of the additional fuel is lower than a predetermined injection pressure.

Further, according to the invention, the judging means judges that an amount of the fuel evaporating, when the additional fuel flows into the cylinder, is smaller than the predetermined fuel evaporating amount when the judging means judges that the pressure of the injection of the additional fuel is higher than a predetermined injection pressure and the amount of the additional fuel is larger than a predetermined additional fuel amount.

Further, according to the invention, the judging means judges that an amount of the fuel evaporating, when the additional fuel flows into the cylinder is smaller than the predetermined fuel evaporating amount when the judging means judges that the temperature of an air in the cylinder is lower than a predetermined air temperature.

Further, according to the invention, the judging means judges that the temperature of the air in the cylinder is lower than the predetermined air temperature when the judging means judges that the temperature of an intake air introduced into the cylinder is lower than a predetermined intake air temperature.

Further, according to the invention, the judging means judges that the temperature of the air in the cylinder is lower than the predetermined air temperature when the judging means judges that the temperature of an exhaust gas discharged from the cylinder is lower than a predetermined exhaust gas temperature.

Further, according to the invention, the judging means judges that the temperature of the air in the cylinder is lower than the predetermined air temperature when the judging means judges that an interval between the predetermined first and second timings is longer than a predetermined interval.

Further, according to the invention, the judging means judges that an amount of the fuel evaporating when the additional fuel flows into the cylinder is smaller than the predetermined fuel evaporating amount when the judging means judges that the pressure in the cylinder is higher than a predetermined pressure.

Further, according to the invention, a piston is inserted in the cylinder, and the judging means judges that an amount of fuel adhering to the inner wall of the cylinder is larger than the predetermined fuel amount when the judging means judges that a ratio of an area of a top face of the piston relative to an area of the inner wall within range of the injection of the additional fuel is smaller than a predetermined ratio.

Further, according to the invention, the ratio of the area of the top face of the piston relative to the area of the inner wall becomes large as the piston becomes close to a top dead center of a compression stroke of the engine.

Further, according to the invention, the judging means judges that an amount of fuel adhering to the inner wall of the cylinder is larger than the predetermined fuel amount when the judging means judges that an amount of the additional fuel is larger than a predetermined additional fuel amount.

Further, according to the invention, the control means increases an amount of the fuel evaporating when the fuel flows into the cylinder to a predetermined evaporating fuel amount when the judging means judges that an amount of fuel adhering to the inner wall of the cylinder is larger than the predetermined fuel amount.

Further, according to the invention, the control means increases an amount of the fuel evaporating when the fuel flows into the cylinder to the predetermined evaporating fuel amount by controlling the pressure of the injection of the additional fuel at the predetermined second timing.

Further, according to the invention, a piston is inserted in the cylinder, the control means increases a ratio of an area of a top face of the piston relative to an area of the inner wall of the cylinder within range of the injection of the additional fuel to a predetermined ratio when the judging means judges that an amount of the fuel adhering to the inner wall of the cylinder is larger than the predetermined fuel amount.

Further, according to the invention, the control means increases the ratio of the area of the top face of the piston relative to the area of the inner wall of the cylinder by injecting the additional fuel when the piston becomes close to a top dead center of a compression stroke of the engine.

Further, according to the invention, the control means directs a direction of the additional fuel toward a center of the top face of the piston when the judging means judges that the ratio of the area of the top face of the piston relative to the area of the inner wall of the cylinder becomes smaller than the predetermined ratio.

Further, according to the invention, the control means decreases an amount of the additional fuel when the judging means judges that an amount of fuel adhering to the inner wall of the cylinder is larger than the predetermined fuel amount.

Further, according to the invention, the engine comprises a plurality of cylinders, an exhaust gas recirculating passage for recirculating an exhaust gas from at least one of the cylinders into an intake passage of the engine, and a shutting valve for shutting the exhaust gas recirculating passage, and when the control means judges that an amount of the fuel adhering to the inner wall of the cylinder is larger than the predetermined fuel amount, the control means closes the shutting valve and controls the operation of said fuel injecting means to inject a part of the additional fuel at the predetermined second timing of each cylinder.

Further, according to the invention, the control means stops injecting the additional fuel when the judging means judges that an amount of fuel adhering to the inner wall of the cylinder is larger than the predetermined fuel amount.

The present invention may be more fully understood from the description of the preferred embodiments of the invention set forth below, together with the accompanying drawings.

DESCRIPTION OF THE PREFERRED EMBODIMENTS

A fuel injecting device for an engine according to the first embodiment of the invention will be explained below.

Figure 1:
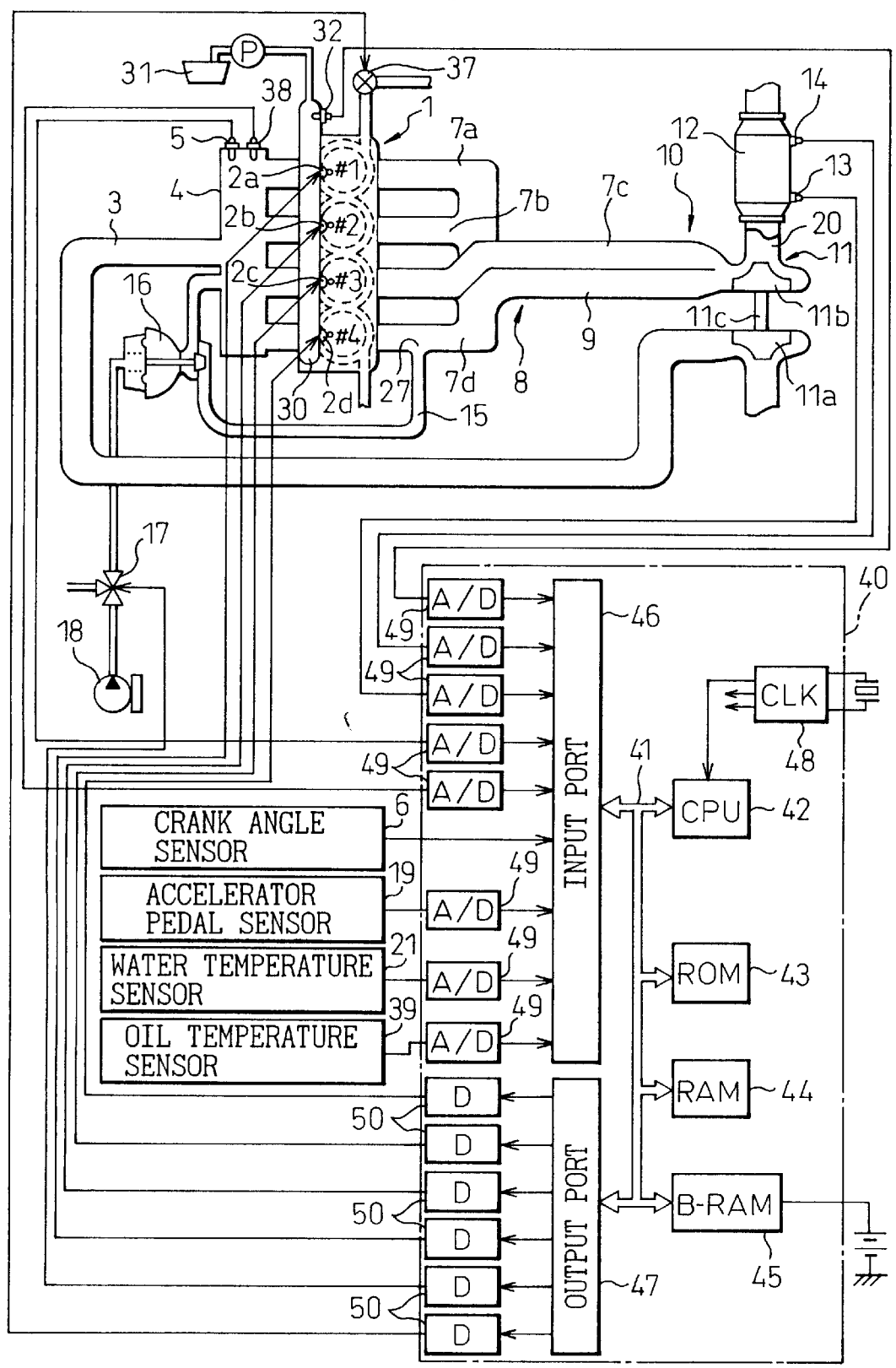
FIG. 1 is a view of an engine according to the first embodiment of the invention.

As shown in FIG. 1, reference number 1 illustrates an engine body, numbers #1 to #4 illustrate first to fourth cylinders formed in the engine body 1, numbers 2a to 2d illustrate first to fourth injectors for injecting fuel into the cylinders #1 to #4, and number 3 illustrates an intake passage connected to the engine body 1 via an intake manifold 4.

An intake air pressure sensor 5 is provided in the intake manifold 4 for detecting the pressure of the intake air. According to the first embodiment, an amount of an intake air introduced into the cylinders #1 to #4 can be calculated on the basis of the pressure of the intake air. Further, an intake air temperature sensor 38 is provided in the intake manifold 4 for detecting the temperature of the intake air.

The invention can be applied to an engine such as a compression engine or a lean burn engine which is operated under an air-fuel ratio larger than the stoichiometric air-fuel ratio during the substantial engine operation.

In the engine body 1, a cooling water passage 29 is formed around the cylinders #1 to #4. A cooling control valve 37 is provided in the cooling water passage 29 for controlling the flowing of the cooling water in the cooling water passage 29.

Figure 2:
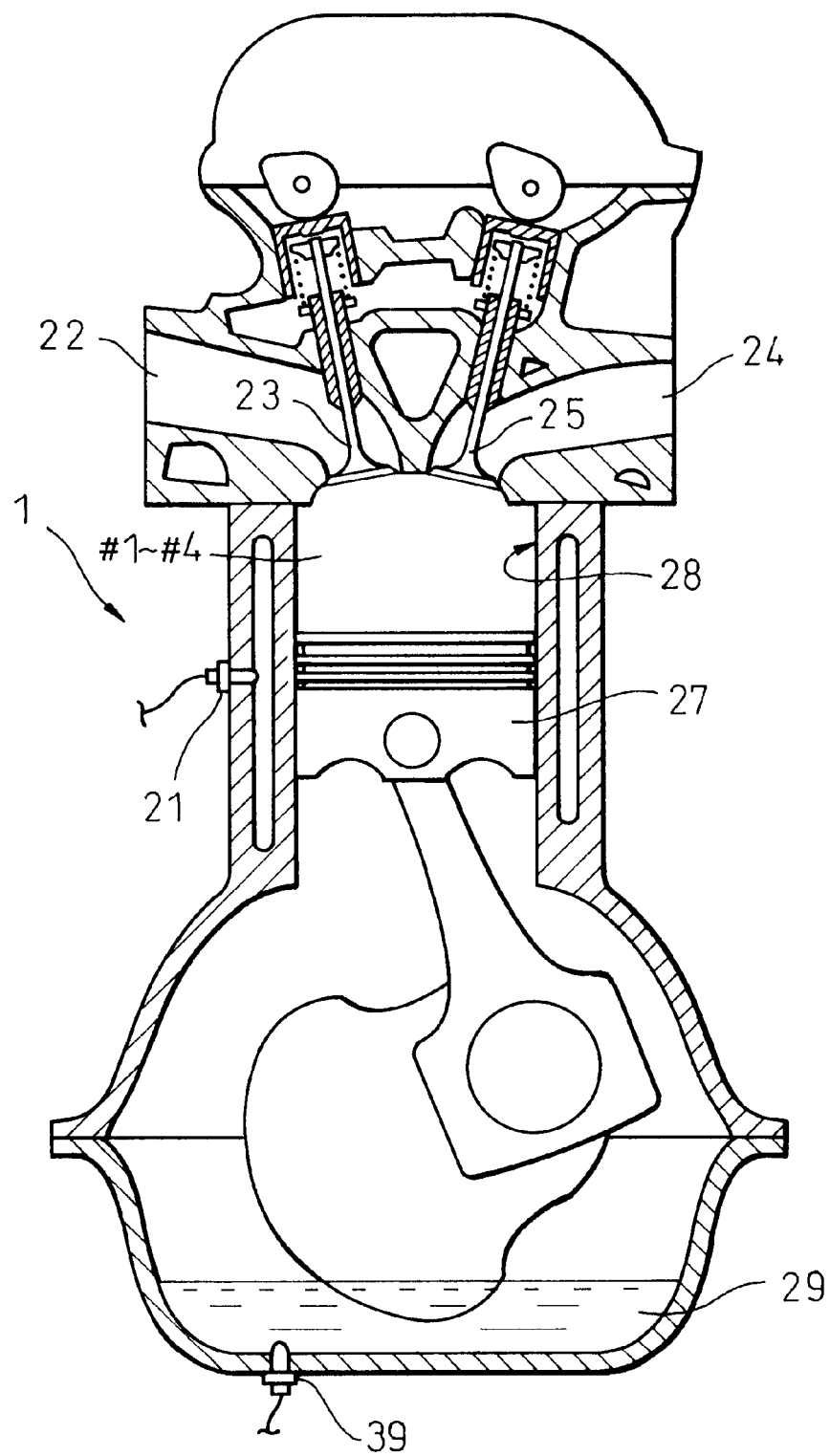
FIG. 2 is a cross sectional view of the engine according to the first embodiment.

The engine comprises a crank sensor 6 for detecting a crank angle, an accelerator pedal sensor 19 for detecting an amount of a depression of an accelerator pedal (not shown), a water temperature sensor 21 (see FIG. 2) for detecting the temperature of a cooling water for cooling the engine body 1, and an oil temperature sensor 39 (see FIG. 2) for detecting the temperature of an engine oil. As shown in FIG. 2, the engine oil 29 is stored under a piston 27 housed in the cylinders, and lubricates parts of the engine. An engine speed is calculated on the basis of the detected crank angle.

The injectors 2a to 2d are connected to a common fuel dispensing means, i.e., a common rail 30. The common rail 30 is connected to a fuel tank 31 via a fuel pump P. Fuel which is pressurized at a predetermined target fuel pressure by the fuel pump P is stored in the common rail 30. In the common rail 30, a fuel pressure sensor 32 is provided for detecting the pressure of the fuel in the common rail 30. The fuel pressure sensor 32 corresponds to means for detecting the pressure of the fuel.

As shown in FIG. 2, reference number 22 illustrates an intake port connected to the intake manifold 4, number 23 illustrates an intake valve positioned in the intake port 22, number 24 illustrates an exhaust port connected to an exhaust branch passage as described below, number 25 illustrates an exhaust valve positioned in the exhaust port 24, and number 28 illustrates an inner wall of the cylinder #1, #2, #3, #4.

First to fourth exhaust branch passages 7a to 7d are connected to the first to fourth cylinders #1 to #4, respectively. The first, second and fourth exhaust branch passages 7a, 7b and 7d are collected at an upstream collection portion 8 downstream of the engine body 1, and are connected to a collection passage 9. The third exhaust branch passage 7c and the collection passage 9 are collected at a downstream collection portion 10 downstream of the upstream collection portion 8, and are connected to a common exhaust passage 20. As shown in FIG. 1, these passages 7c and 9 are connected in such a manner than the exhaust gas is discharged from these passages 7c and 9 in the same direction. Therefore, the exhaust gas discharged from the third exhaust branch passage 7c cannot flow into the collection passage 9, and vice versa. Further, the distance from the downstream collection portion 10 to an opening 27 of the exhaust gas recirculation passage 15 is longer than that from the upstream collection portion 8 to the opening 27 of the exhaust gas recirculation passage 15. Therefore, the exhaust gas discharged from the third exhaust branch passage 7c does not easily arrive at the opening 27 of the exhaust gas recirculation passage 15 in comparison with that discharged from the first and second exhaust branch passages 7a and 7b.

In the first embodiment, in order to further restrict the flow of the exhaust gas from the third exhaust branch passage 7c into the collection passage 9, a cross sectional size of an opening of the third exhaust branch passage 7c may be smaller than that of an opening of the collection passage 9.

In this specification, the words "upstream" and "downstream" are to indicate the flow of the exhaust gas.

The engine comprises a turbo-charger 11 for compressing the intake air to increase the amount of the intake air introduced into the cylinders #1 to #4. The turbo-charger 11 comprises an intake side turbine wheel 11a positioned in the intake passage 3 upstream of the intake manifold 4, and an exhaust side turbine wheel 11b positioned in the common exhaust passage 20 downstream of the downstream collection portion 10. These turbine wheels 11a and 11b are connected via a shaft 11c.

In the first embodiment, the exhaust side turbine wheel 11b is positioned at a position into which the exhaust gas discharged from all cylinders #1 to #4 flows. Therefore, the amount of the exhaust gas passing through the exhaust side turbine wheel 11b is kept largest. Thus, the largest effect of the compression of the intake air by the turbo-charger 11 can be obtained.

Further, in the first embodiment, the downstream collection portion 10 is adjacent to the exhaust side turbine wheel 11b, and the discharged exhaust gas is easily introduced into downstream of the exhaust side turbine wheel 11b by the inertia force of the rotation of the exhaust side turbine wheel 11b. Therefore, the exhaust gas discharged from the third exhaust branch passage 7c cannot flow into the collection passage 9, and vice versa.

The exhaust gas flows into the exhaust side turbine wheel 11b in a direction parallel to the plane of the rotation of the exhaust side turbine wheel 11b, and rotates the exhaust side turbine wheel 11b. Further, the exhaust gas flows out of the exhaust side turbine wheel 11b in a direction perpendicular to the plane of the rotation of the exhaust side turbine wheel 11b.

The intake side turbine wheel 11a is rotated by the rotation of the exhaust side turbine wheel 11b, and withdraws the intake air thereinto in a direction perpendicular to the plane of the rotation of the intake side turbine wheel 11a. Further, the intake side turbine wheel 11a discharges the withdrawn intake air in a direction parallel to the plane of the rotation of the intake side turbine wheel 11a.

A catalyst 12 for purifying nitrogen oxide ($NO_X$) in the exhaust gas discharged from the engine is positioned in the common exhaust passage 20 downstream of the exhaust side turbine wheel 11b. The catalyst 12 adsorbs $NO_X$ and hydrocarbon (HC) on the face thereof to activate $NO_X$ and HC, and reacts the activated $NO_X$ with the activated HC to purify the $NO_X$ (hereinafter, referred to as "$NO_X$ catalyst"). The $NO_X$ catalyst 12 purifies the $NO_X$ within a predetermined range of the temperature thereof. Alternatively, a catalyst may be used which adsorbs $NO_X$ thereon when the exhaust gas includes an excess oxygen, i.e., an amount of oxygen larger than a predetermined oxygen amount, discharges the adsorbed $NO_X$ therefrom when the concentration of the oxygen included in the exhaust gas is decreased, and purifies $NO_X$ with HC.

An upstream temperature sensor 13 for detecting the temperate of the upstream end of the $NO_X$ catalyst 12 is positioned in the upstream end of the $NO_X$ catalyst 12. On the other hand, a downstream temperature sensor 14 for detecting the temperature of the downstream end of the $NO_X$ catalyst 12 is positioned in the downstream end of the $NO_X$ catalyst 12.

One end of an exhaust gas recirculation passage 15 for introducing the exhaust gas from the exhaust branch passages 7a, 7b and 7d into the intake air is connected to the fourth exhaust branch passage 7d at a position such that the exhaust gas discharged from the third cylinder does not arrive at the exhaust gas recirculation passage 15 via the collection passage 9 and the fourth exhaust branch passage 7d.

The other end of the exhaust gas recirculation passage 15 is connected to the intake manifold 4.

An exhaust gas recirculation control valve 16 (hereinafter referred to as "EGR control valve") for controlling the introduction of the exhaust gas into the intake air is positioned in the EGR passage 15 (hereinafter referred to as "EGR passage").

The EGR control valve 16 is in communication with a suction pump 18 and the atmosphere via a three way valve 17. Further, the opening or closing of the EGR control valve 16 is controlled on the basis of the engine driving condition.

When the EGR control valve 16 communicates with the atmosphere via the three way valve 17, atmospheric pressure is introduced into the EGR control valve 16 to close the valve 16. In this case, the exhaust gas is not introduced into the intake air. On the other hand, when the EGR control valve 16 communicates with the suction pump 18 via the three way valve 17, a negative pressure is introduced into the EGR control valve 16 to open the valve 16. In this case, the exhaust gas is introduced into the intake air.

When the velocity at which the flame is transmitted in the cylinders during the power stroke of the engine is larger, the amount of the NOx generated in the engine is large. Further, when the temperature at which the fuel is burned in the cylinders during the power stroke of the engine is high, the amount of the $NO_X$ generated in the engine is large.

On the other hand, an inert gas decreases the velocity at which the flame is transmitted. Therefore, when the amount of the inert gas in the intake air is large, the velocity at which the flame is transmitted in the cylinders during the power stroke of the engine is decreased.

Further, the inert gas absorbs the heat. Therefore, when the amount of the inert gas in the intake air is large, the temperature at which the fuel is burned in the cylinders during the power stroke of the engine is low.

From the above description, when the inert gas such as $CO_2$ or $H_2O$ is introduced into the intake air, the velocity at which the flame is transmitted in the cylinders during the power stroke of the engine is small, and the temperature at which the fuel is burned in the cylinders during the power stroke of the engine is low. Therefore, the generation of the $NO_X$ in the engine is restricted.

An electronic control unit (ECU) 40 is a digital computer, and comprises a microprocessor (CPU) 42, a read only memory (ROM) 43, a random access memory (RAM) 44, a back-up RAM (B-RAM) 45, an input port 46, an output port 47 and a clock generating device 48. These components are connected by a bilateral bus 41.

The upstream temperature sensor 13, the downstream temperature sensor 14, the fuel pressure sensor 32, the intake air pressure sensor 5, the intake air temperature sensor 38, the accelerator pedal sensor 19, the water temperature sensor 21 and the oil temperature sensor 39 are connected to the input port 46 via corresponding AD converters 49, respectively. The crank angel sensor 6 is directly connected to the input port 46. On the other hand, the output port 47 is connected to each injector 2a to 2d, the three way valve 17 and the cooling control valve 37 via corresponding drive circuits 50, respectively.

An operation of pilot and main fuel injections according to the first embodiment will be generally explained below. The main fuel injection (hereinafter referred to as "main injection") is operated to inject fuel from the injectors to drive the engine, and the pilot fuel injection (hereinafter referred to as "pilot injection") is operated prior to the main injection.

In the operation of the pilot and main injections, at first, a pressure of the fuel in the common rail 30 is detected by the fuel pressure sensor 32 at a predetermined crank angle during the compression stroke of each cylinder. Next, a period for operating the injector at the pilot injection (hereinafter referred to as "pilot period") is calculated on the basis of the detected fuel pressure. When a constant amount of the fuel should be injected from the injector, the lower the detected pressure of the fuel is, the longer the pilot period is. Next, the pilot injection is operated to operate the injector for the calculated pilot period immediately prior to a top dead center (TDC) of the compression stroke to inject a predetermined amount of the fuel into the cylinder. Note that the pilot injection is operated to decrease the amount of the $NO_X$ and noises generated in the cylinder.

Next, an amount o the depression of the accelerator pedal is detected by the accelerator pedal sensor 19. Next, a period for operating the injector at the main injection (hereinafter referred to as "main period") is calculated on the basis of the detected fuel pressure and the detected amount of the depression of the accelerator pedal. When a constant amount of the fuel should be injected from the injector, the lower the detected pressure of the fuel is, the longer the pilot period is. Further the larger the amount of the depression of the accelerator pedal is, the longer the main period is, and therefore the larger the amount of the fuel injected from the injector is. Next, the main injection is operated to operate the injector for the calculated main period immediately subsequent to the burning of the fuel injected at the pilot injection. Note that the main injection is operated to drive the engine.

In the first embodiment, the pilot and main injections are operated sequentially in the first, third, fourth and second cylinders.

Figure 3:
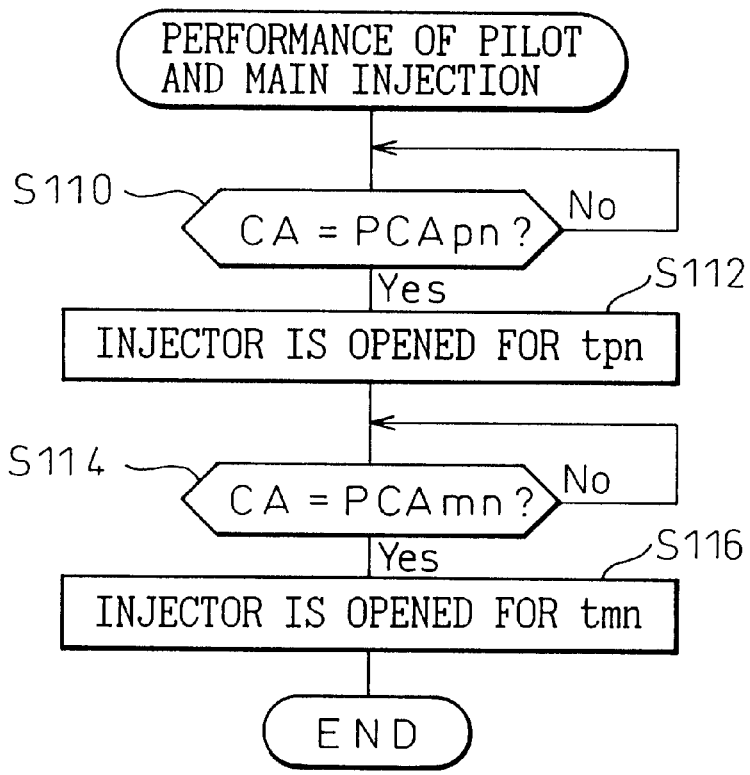
FIG. 3 is a flowchart of the operation of the pilot and main injections according to the first embodiment.

The operation of the pilot and main injections according to the first embodiment will be explained in detail, by referring to the flowchart in FIG. 3. In this flowchart, n represents the number of the cylinder, and changes sequentially 1, 3, 4, 2.

At step 110, it is judged if the present crank angle detected by the crank sensor 6 is a predetermined pilot crank angle (CA=PCApn). When CA=PCApn, it is judged that the pilot injection should be operated, the routine proceeds to step 112 where the injector is operated for the predetermined pilot period tpn calculated on the basis of the pressure of the fuel in the common rail 30 as described above, and the routine proceeds to step 114. On the other hand, when CA≠PCApn, it is judged that the pilot injection should not be operated, the routine returns to step 110, and the routine is repeated until it is judged that CA=PCApn.

At step 114, it is judged if the present crank angle detected by the crank sensor 6 is a predetermined main crank angle (CA=PCAmn). When CA=PCAmn, it is judged that the main injection should be operated, the routine proceeds to step 116 where the injector is operated for the predetermined main period tmn calculated on the basis of the pressure of the fuel in the common rail 30 and the amount of the depression of the accelerator pedal as described above, and the routine is ended. On the other hand, when CA≠PCAmn, it is judged that the main injection should not be operated, the routine returns to step 114, and the routine is repeated until it is judged that CA=PCAmn.

Figure 4:
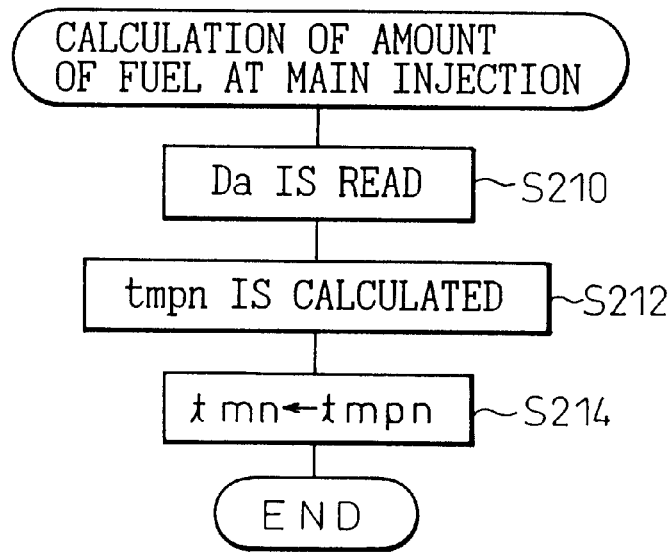
FIG. 4 is a flowchart of the calculation of the amount of the fuel injected by the main injection according to the first embodiment.
Figure 5:
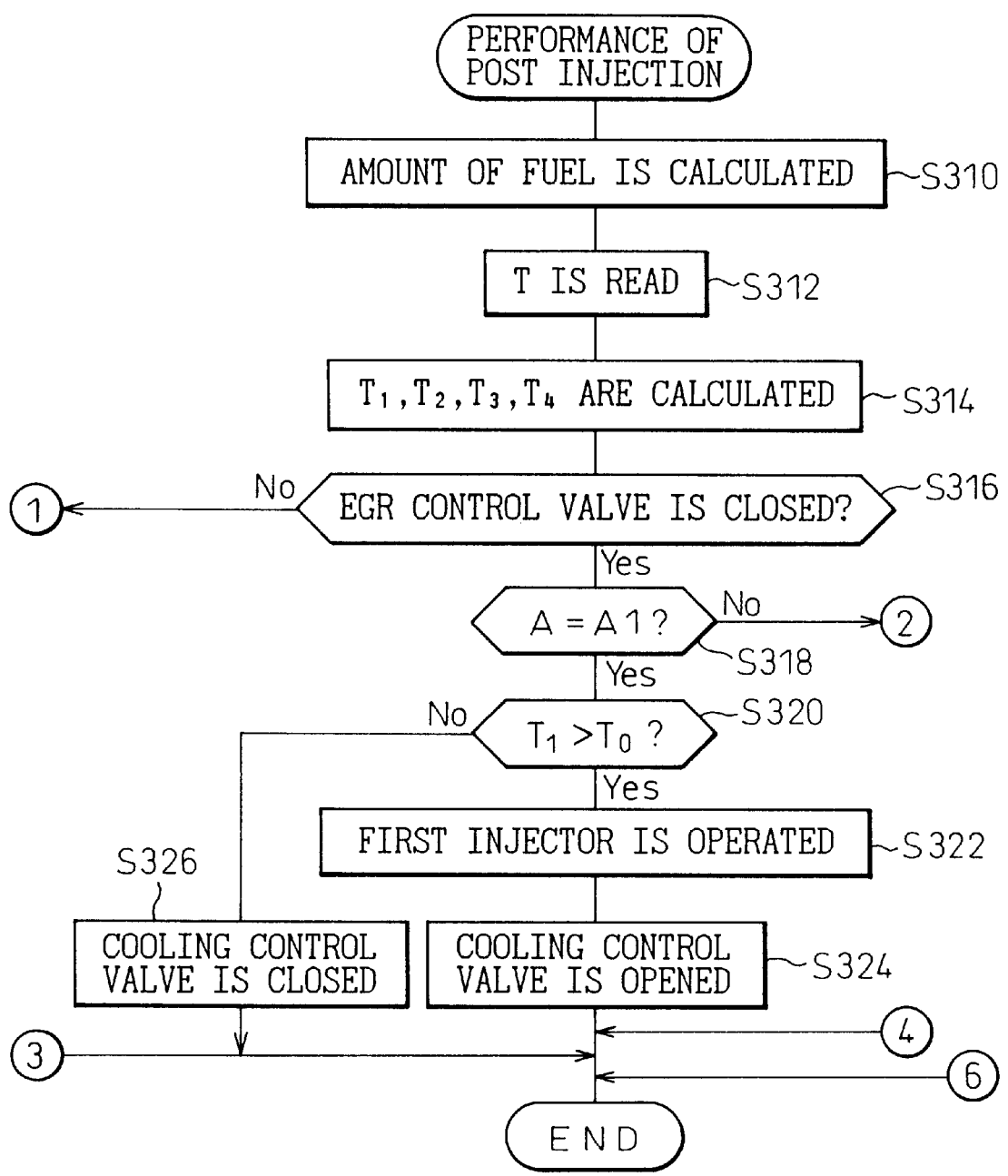
FIG. 5 is a part of a flowchart of the operation of the post injection according to the first embodiment.

A calculation of the amount of the fuel to be injected at the main injection according to the first embodiment will be explained in detail, by referring to the flowchart in FIG. 4. In this flowchart, n represents the number of the cylinder, and changes sequentially 1, 3, 4, 2.

At step 210, the amount of the depression of the accelerator pedal is detected by the accelerator pedal sensor 19, the routine proceeds to step 212 where the main period tmpn for the injector n is calculated on the basis of the detected amount of the depression of the accelerator pedal and the detected pressure of the fuel in the common rail 30 as described above, the routine proceeds to step 214 where the calculated main period tmpn is input into the predetermined main period tmp, and the routine is ended.

An operation of a post injection according to the first embodiment will be explained below. The post fuel injection (hereinafter referred to as "post injection") is operated subsequent to the main injection to operate the injector to inject fuel into the cylinder to allow to purify the exhaust gas with the reducing agent by the $NO_X$ catalyst. In the first embodiment, the fuel corresponds to the reducing agent.

At first, the temperature of the cooling water is detected by the water temperature sensor 28 to calculate the temperature in the cylinders. In the first embodiment, the water temperature sensor corresponds to means for detecting the temperature in the cylinder.

When the temperature in the cylinder is higher than a predetermined minimum cylinder temperature and the EGR control valve 16 is opened, the post injection is operated only in the third cylinder at a predetermined post timing during one of the power and the exhaust strokes to operate the third injector 2c to inject fuel into the third cylinder #3. The above predetermined minimum cylinder temperature is set in such a manner that the fuel injected by the post injection can evaporate during the flowing of the fuel in the cylinder, or even if the fuel adheres to the inner wall 28 of the cylinder, the fuel can evaporate from the inner wall 28 of the cylinder immediately. In other words, according to first embodiment, it is judged that an amount of the fuel adhering to the inner wall of the cylinder is smaller than a predetermined fuel amount when an amount of the fuel evaporating from the inner wall of the cylinder is larger than a predetermined fuel evaporating amount, or an amount of the fuel evaporating during the flowing of the fuel in the cylinder is larger than a predetermined fuel evaporating amount. Of course, the post injections in the first, second and fourth cylinder are not operated since the fuel injected therefrom may enter into the EGR passage 15.

On the other hand, when the temperature in the cylinder is lower than the predetermined cylinder minimum temperature and the EGR control valve 16 is opened, it is judged that an amount of the fuel injected by the post injection larger than a predetermined fuel amount may adhere to the inner wall 28 of the cylinder, and the post injection is not operated. Of course, the post injections in the first, second and fourth cylinder are not operated.

Further, when the EGR control valve 16 is closed, the post injection is operated in any cylinder, the temperature in which is higher than the predetermined cylinder minimum temperature.

Therefore, according to the first embodiment, the adherence of the fuel to the inner wall of the cylinder is restricted. Thus, the engine oil is not deteriorated by the fuel so that the degree of the lubrication of the engine oil is kept large. Further, the amount of the fuel sufficient to purify the exhaust gas can be fed to the $NO_X$ catalyst so that the degree of purifying the exhaust gas by the $NO_X$ catalyst is kept large.

Alternatively, the post injection may be operated when it is judged that no fuel will not adhere to the inner wall of the cylinder. Also, the temperature of the inner wall of the cylinder may be used instead of the temperature in the cylinder. Further, it may judged that the temperature in the cylinder is lower than a predetermined temperature when the interval between the main and post injections is longer than a predetermined interval.

Figure 38:
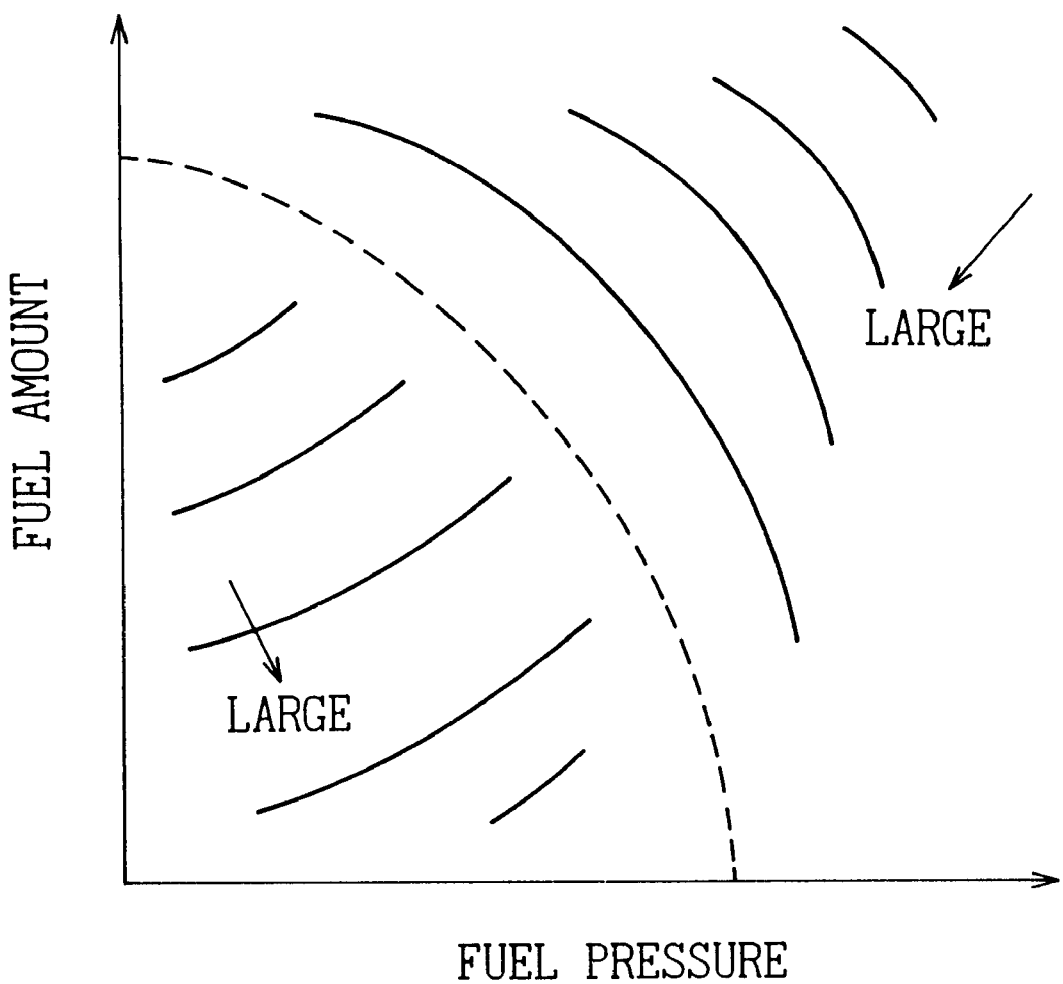
FIG. 38 is a view showing the relationship between, the pressure of the injection of the fuel at the post injection, the amount of the fuel to be injected by the post injection, and an amount of the fuel evaporating during the flowing of the fuel in the cylinder.

Moreover, in the first embodiment, it may be judged that an amount of the fuel evaporating during the flowing of the fuel in the cylinder is larger than the predetermined fuel evaporating amount on the basis of the map in FIG. 38. The map shows a relationship between the pressure of the injection of the fuel at the post injection, the amount of the fuel to be injected by the post injection, and an amount of the fuel evaporating during the flowing of the fuel in the cylinder. In this map, within an area enclosed by a dotted line, the larger the pressure of the injection of the fuel is, the larger the amount of the fuel evaporating during the flowing of the fuel in the cylinder is. Also, within the area enclosed by a dotted line, the smaller the amount of the fuel is, the larger the amount of the fuel evaporating during the flowing of the fuel in the cylinder is. On the other hand, outside of the area enclosed by the dotted line, the lower the pressure of the injection of the fuel is, the larger the amount of the fuel evaporating during the flowing of the fuel in the cylinder is. Also, outside of the area enclosed by a dotted line, the smaller the amount of the fuel is, the larger the amount of the fuel evaporating during the flowing of the fuel in the cylinder is.

According to the first embodiment, the amount of the fuel to be fed to the $NO_X$ catalyst 12 is calculated on the basis of the amount of the $NO_X$ generated in the engine and the temperature of the $NO_X$ catalyst 12. The amount of the $NO_X$ generated in the engine is calculated on the basis of the pressure of the intake air and the engine speed. The temperature of the $NO_X$ catalyst 12 is calculated on the basis of the temperatures of the upstream and downstream ends of the $NO_X$ catalyst 12.

When the EGR control valve 16 is closed, the amount of the fuel to be injected by the post injection from each injector is determined to correspond to the amount of the $NO_X$ discharged from each cylinder. On the other hand, when the EGR control valve 16 is opened, the amount of the fuel injected by the post injection from the third injector 2c is determined to correspond to the total amount of the $NO_X$ discharged from all cylinders.

Further, according to the first embodiment, when the temperature in each cylinder is higher than the predetermined cylinder minimum temperature, it is judged that the temperature in the cylinder should be decreased, and the cooling control valve 37 is opened to introduce the cooling water into the engine body 1. On the other hand, when the temperature in each cylinder is lower than the predetermined cylinder minimum temperature, it is judged that the temperature in the cylinder should be increased, and the cooling control valve 37 is closed.

The operation of the post injection according to the first embodiment will be explained in detail, by referring the flowchart in FIGS. 5 to 8.

At step 310, the amount of the fuel to be injected by the post injection to purify the $NO_X$ in the $NO_X$ catalyst is calculated as described above, the routine proceeds to step 312 where the temperature T of the cooling water is read from the water temperature sensor 28, the routine proceeds to step 314 where the temperature $T_1$, $T_2$, $T_3$, $T_4$ in each cylinder are calculated on the basis of the detected temperature T of the cooling water, and the routine proceeds to step 316.

At step 316, it is judged if the EGR control valve 16 is closed. When the EGR control valve 16 is closed, the routine proceeds to step 318. On the other hand, when the EGR control valve 16 is open, the routine proceeds to step 328 in FIG. 6.

At step 318, it is judged if the present crank angle A is a first predetermined post crank angle A1 (A=A1). The first predetermined post crank angle A1 is during one of the power and the exhaust strokes in the first cylinder #1, and a timing to operate the post injection in the first cylinder #1. At step 318, when A=A1, it is judged that the post injection should be operated in the first cylinder #1, and the routine proceeds to step 320. On the other hand, when A≠A1, it is judged that no post injection should be operated in the first cylinder #1, and the routine proceeds to step 344 in FIG. 7.

At step 320, it is judged if the temperature $T_1$ in the first cylinder #1 is higher than the predetermined cylinder minimum temperature $T_0$ as described above ($T_1 > T_0$). When $T_1 > T_0$, it is judged that the post injection in the first cylinder #1 may be operated, the routine proceeds to step 322 where the first injector 2a is operated to inject the fuel into the first cylinder #1, the routine proceeds to step 324 where the cooling control valve 37 is opened to decrease the temperature in the cylinders, and the routine is ended. On the other hand, when $T_1 \leq T_0$, it is judged that no post injection should be operated in the first cylinder #1, the routine proceeds to step 326 where the cooling control valve 37 is closed to increase the temperature in the cylinders, and the routine is ended.

At step 344, it is judged if the present crank angle A is a second predetermined post crank angle A2 (A=A2). The second predetermined post crank angle A2 is during one of the power and the exhaust strokes in the second cylinder #2, and a timing to operate the post injection in the second cylinder #2. At step 344, when A=A2, it is judged that the post injection should be operated in the second cylinder #2, and the routine proceeds to step 346. On the other hand, when A≠A2, it is judged that no post injection should be operated in the second cylinder #2, and the routine proceeds to step 354.

At step 348, it is judged if the temperature $T_2$ in the second cylinder #2 is higher than the predetermined cylinder minimum temperature $T_0$ ($T_2 > T_0$). When $T_2 > T_0$, it is judged that the post injection may be operated in the second cylinder #2, the routine proceeds to step 348 where the second injector 2b is operated to inject the fuel into the second cylinder #2, the routine proceeds to step 350 where the cooling control valve 37 is opened to decrease the temperature in the cylinders, and the routine is ended. On the other hand, when $T_2 \leq T_0$, it is judged that no post injection should be operated in the second cylinder #2, the routine proceeds to step 352 where the cooling control valve 37 is closed to increase the temperature in the cylinders, and the routine is ended.

At step 354, it is judged if the present crank angle A is a third predetermined post crank angle A3 (A=A3). The third predetermined post crank angle A3 is during one of the power and the exhaust strokes in the third cylinder #3, and a timing to operate the post injection in the third cylinder #3. At step 354, when A=A3, it is judged that the post injection should be operated in the third cylinder #3, and the routine proceeds to step 356. On the other hand, when A≠A3, it is judged that no post injection should be operated in the third cylinder #3, and the routine proceeds to step 362 in FIG. 8.

At step 356, it is judged if the temperature T3 in the third cylinder #3 is higher than the predetermined cylinder minimum temperature $T_0$ ($T_3>T_0$) When $T_3>T_0$, it is judged that the post injection may be operated in the third cylinder #3, the routine proceeds to step 358 where the third injector 2c is operated to inject the fuel into the third cylinder #3, the routine proceeds to step 360 where the cooling control valve 37 is opened to decrease the temperate in the cylinders, and the routine is ended. On the other hand, when $T_3 \leq T_0$ it is judged that no post injection should be operated in the third cylinder #3, the routine proceeds to step 352 where the cooling control valve 37 is closed to increase the temperature in the cylinders, and the routine is ended.

At step 362, it is judged if the present crank angle A is a fourth predetermined post crank angle A4 (A=A4). The fourth predetermined post crank angle A4 is during one of the power and the exhaust strokes in the fourth cylinder #4, and a timing to operate the post injection in the fourth cylinder #4. At step 362, when A=A4, it is judged that the fourth injection should be operated in the fourth cylinder #4, and the routine proceeds to step 364. On the other hand, when A≠A4, it is judged that the fourth injection should not be operated in the fourth cylinder #4, and the routine proceeds to step 372.

At step 364, it is judged if the temperature $T_4$ in the fourth cylinder #4 is higher than the predetermined cylinder minimum temperature $T_0$ ($T_4>T_0$) When $T_4>T_0$, it is judged that the post injection may be operated in the fourth cylinder #4, the routine proceeds to step 366 where the fourth injector 2d is operated to inject the fuel into the fourth cylinder #4, the routine proceeds to step 368 where the cooling control valve 37 is opened to decrease the temperature in the cylinders, and the routine is ended. On the other hand, when $T_4 \leq T_0$, it is judged that no post injection should be operated in the fourth cylinder #4, the routine proceeds to step 370 where the cooling control valve 37 is closed to increase the temperature in the cylinders, and the routine is ended.

At step 372, it is judged if the temperature $T_4$ in the fourth cylinder #4 is higher than the predetermined cylinder minimum temperature To ($T_4>T_0$). When $T_4>T_0$, the routine proceeds to step 374 where the cooling control valve 37 is opened to decrease the temperature in the cylinders, and the routine is ended. On the other hand, when $T_4 \leq T_0$, the routine proceeds to step 370 where the cooling control valve 37 is closed to increase the temperature in the cylinders, and the routine is ended.

Figure 6:
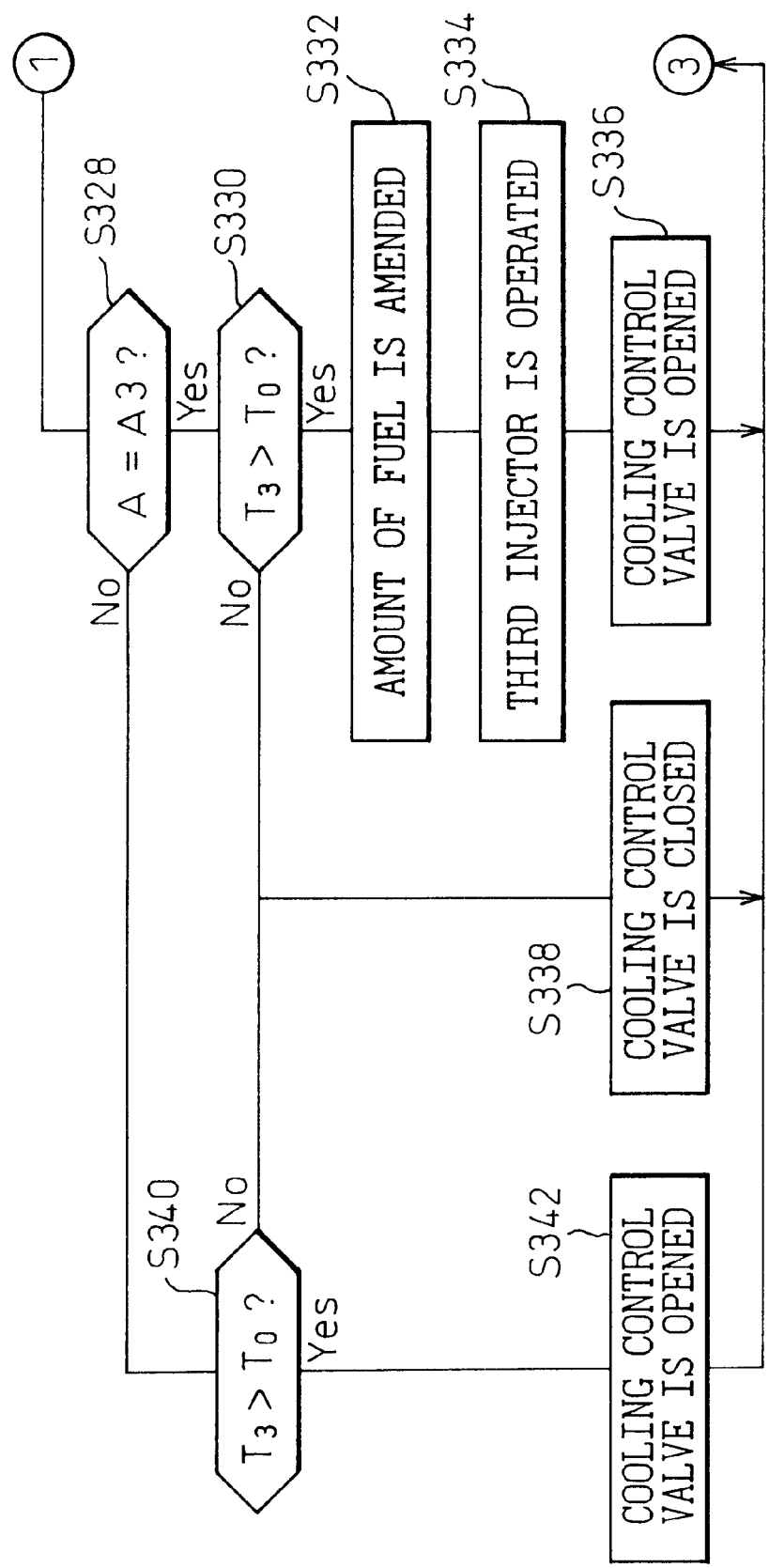
FIG. 6 is a part of the flowchart of the operation of the post injection according to the first embodiment.
Figure 7:
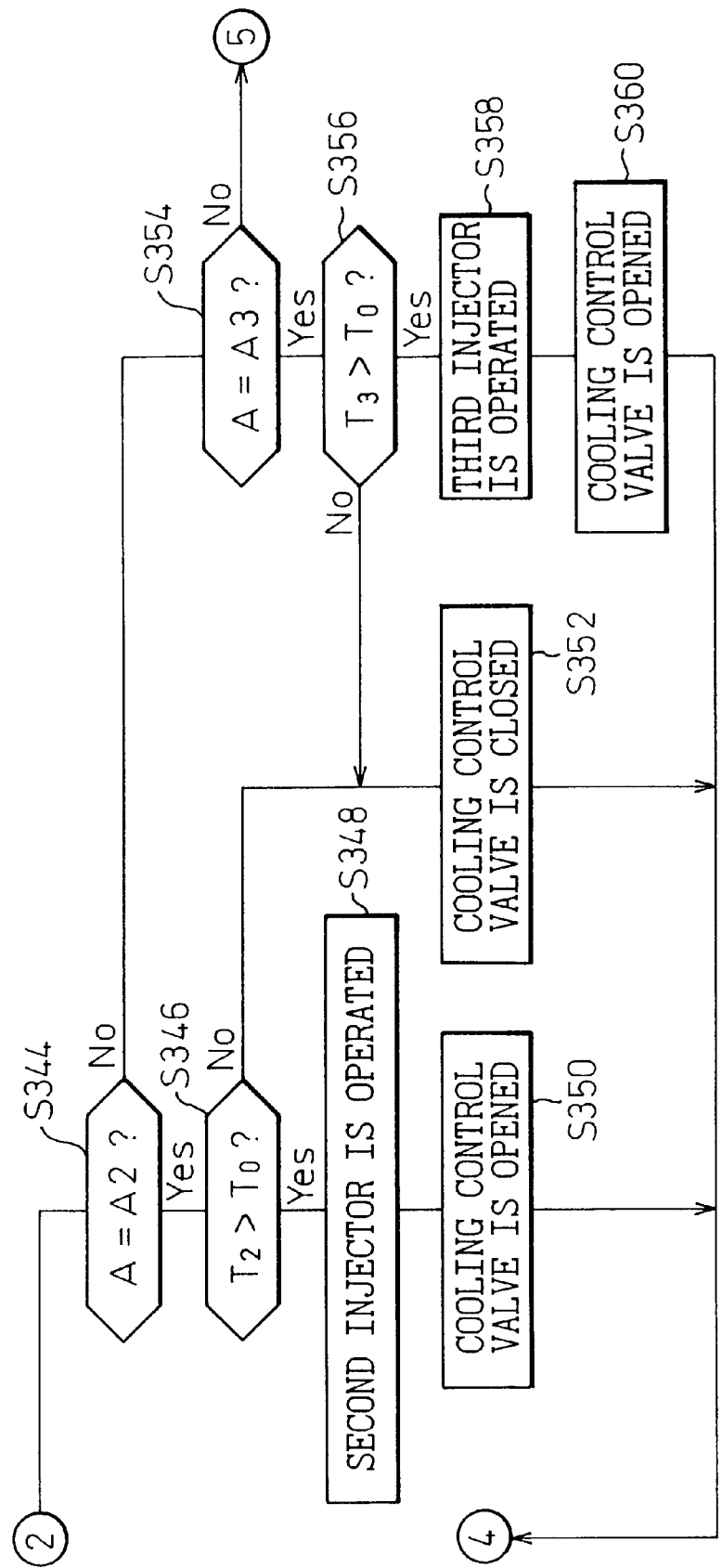
FIG. 7 is a part of the flowchart of the operation of the post injection according to the first embodiment.
Figure 8:
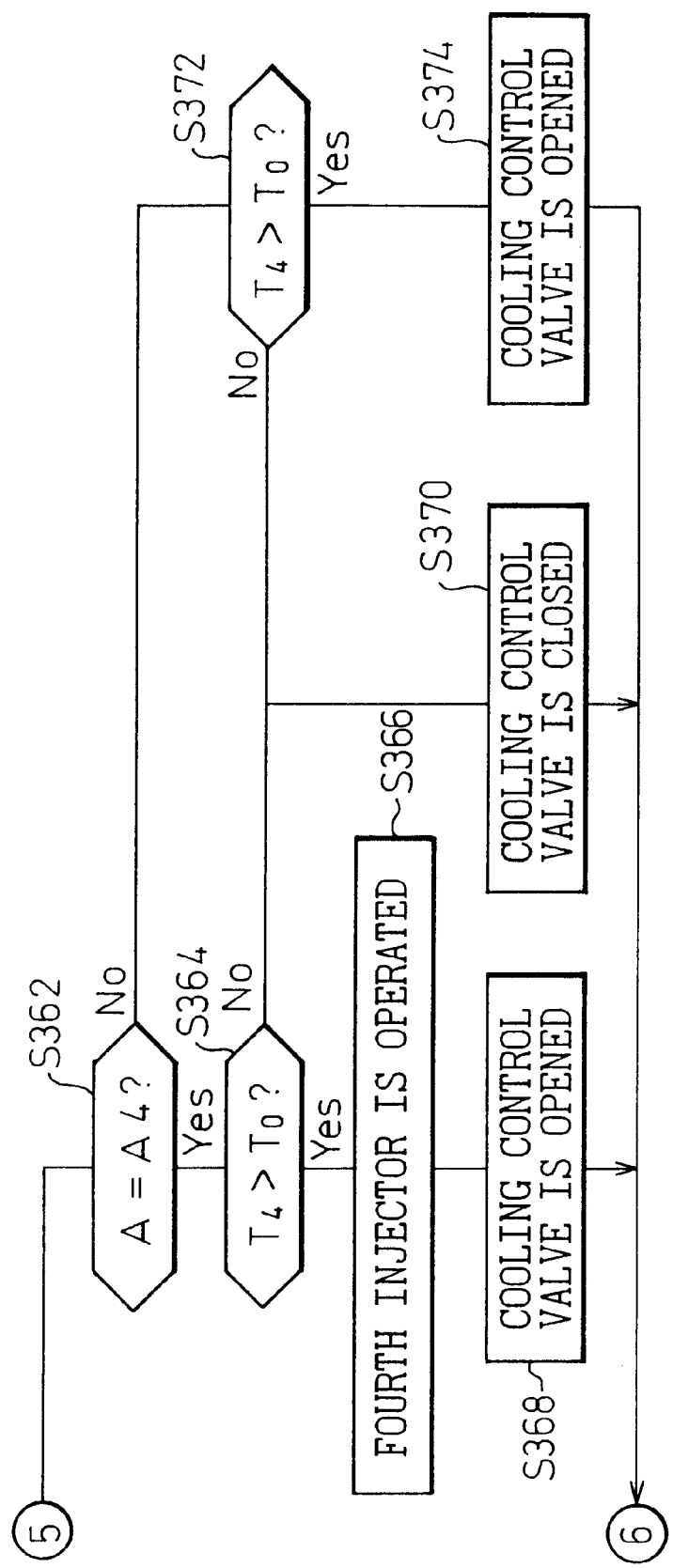
FIG. 8 is a part of the flowchart of the operation of the post injection according to the first embodiment.

At step 328 in FIG. 6, it is judged if the present crank angle A is the third predetermined post crank angle A3 (A=A3). When A=A3, it is judged that the post injection should be operated in the third cylinder #3, and the routine proceeds to step 330. On the other hand, when A≠A3, it is judged that no post injection should be operated in the third cylinder #3, and the routine proceeds to step 340 in FIG. 8.

At step 330, it is judged if the temperature $T_3$ in the third cylinder #3 is higher than the predetermined cylinder minimum temperature $T_0$ ($T_3>T_0$). When $T_3>T_0$, it is judged that the post injection may be operated in the third cylinder #3, the routine proceeds to step 332 where the amount of the fuel to be injected from the third injector 2c is amended to correspond to the total amount of the $NO_X$ generated in all cylinders, the routine proceeds to step 334 where the third injector 2c is operated to inject the fuel into the third cylinder #3, the routine proceeds to step 336 where the cooling control valve 37 is opened to decrease the temperature in the cylinders, and the routine is ended. On the other hand, when $T_3 \leq T_0$, it is judged that no post injection should be operated in the third cylinder #3, the routine proceeds to step 340 where the cooling control valve 37 is closed to increase the temperature in the cylinders, and the routine is ended.

At step 340, it is judged if the temperature $T_3$ in the third cylinder #3 is higher than the predetermined cylinder minimum temperature To ($T_3>T_0$). When $T_3>T_0$, the routine proceeds to step 342 where the cooling control valve 37 is opened to decrease the temperature in the cylinders, and the routine is ended. On the other hand, when $T_3 \leq T_0$, the routine proceeds to step 338 where the cooling control valve 37 is closed to increase the temperature in the cylinders, and the routine is ended.

Alternatively, in the first embodiment, some water temperature sensors may be used to calculate the temperate of each cylinder.

An operation of a post injection according to the second embodiment will be explained below. The structure of the engine and the pilot and main injections in the second embodiment are the same as those in the first embodiment. Therefore, an explanation thereof will not be given.

In first embodiment, the $NO_X$ catalyst 12 may be deteriorated due to the stack of the fuel therein. Therefore, according to the second embodiment, the $NO_X$ catalyst 12 is restored without the adherence of the fuel to the inner wall of the cylinder when it is judged that the $NO_X$ catalyst is deteriorated.

In the second embodiment, at first, it is judged if the $NO_X$ catalyst 12 is deteriorated. When the $NO_X$ catalyst 12 is not deteriorated, the post injection is operated in the third cylinder #3 to feed the fuel to the $NO_X$ catalyst 12 for purifying the exhaust gas. The amount of the fuel to be injected is calculated according to the same way as the first embodiment.

On the other hand, when the $NO_X$ catalyst 12 is deteriorated due to the stack of the fuel in the $NO_X$ catalyst 12, it is judged that an amount of the fuel larger than that to be injected when the $NO_X$ catalyst 12 is not deteriorated should be injected in the third cylinder. The injected fuel is burned in the third cylinder #3 to increase the temperature of the exhaust gas. The exhaust gas having the increased temperature can burn the fuel stacked in the $NO_X$ catalyst 12. Therefore, the $NO_X$ catalyst 12 is restored.

However, if the amount of the fuel to be injected in the third cylinder #3 is larger than a predetermined maximum fuel amount, the EGR control valve 16 is closed, the amount of the fuel to be injected is divided into four, and the post injection is operated in each cylinder to inject the divided amount of the fuel. The predetermined maximum fuel amount is set in such a manner that an amount of the fuel injected at the post injection larger than a predetermined fuel amount does not adhere to the inner wall 28 of the cylinder.

Therefore, according to the second embodiment, an amount of the fuel sufficient to restore the $NO_X$ catalyst 12 can be burned in the cylinders to increase the temperature of the exhaust gas so that the $NO_X$ catalyst 12 can be surely restored. Of course, according to the second embodiment, the adherence of the fuel to the inner wall of the cylinder is restricted.

In the second embodiment, if the amount of the fuel to be injected in each cylinder is limited to that smaller than the predetermined fuel amount, the adherence of the fuel to the inner wall of the cylinder can be surely restricted.

Figure 9:
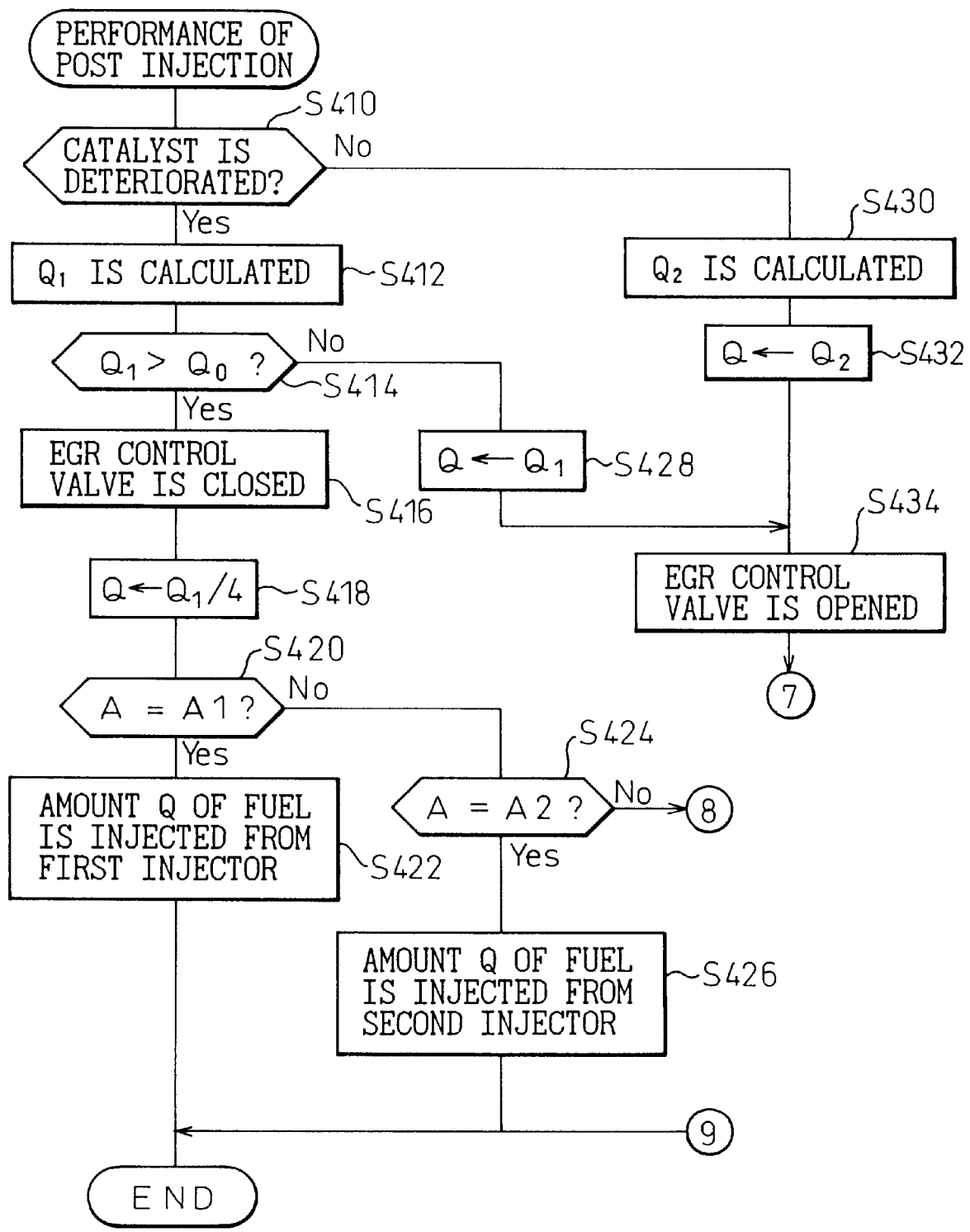
FIG. 9 is a part of a flowchart of the operation of the post injection according to the second embodiment of the invention.

The operation of the post injection according to the second embodiment will be explained in detail, by referring the flowchart in FIGS. 9 and 10.

At step 410, it is judged if the $NO_X$ catalyst 12 is deteriorated. When the $NO_X$ catalyst 12 is deteriorated, the routine proceeds to step 412 where the first amount $Q_1$ of the fuel sufficient to restore the $NO_X$ catalyst 12 is calculated, and the routine proceeds to step 414. On the other hand, when the $NO_X$ catalyst 12 is not deteriorated, the routine proceeds to step 430 where the second amount $Q_2$ of the fuel sufficient to purify the exhaust gas by the $NO_X$ catalyst 12 is calculated, the routine proceeds to step 432 where the second amount $Q_2$ is input into a predetermined fuel amount Q, the routine proceeds to step 434 where the EGR control valve 16 is opened, and the routine proceeds to step 444 in FIG. 10.

Figure 10:
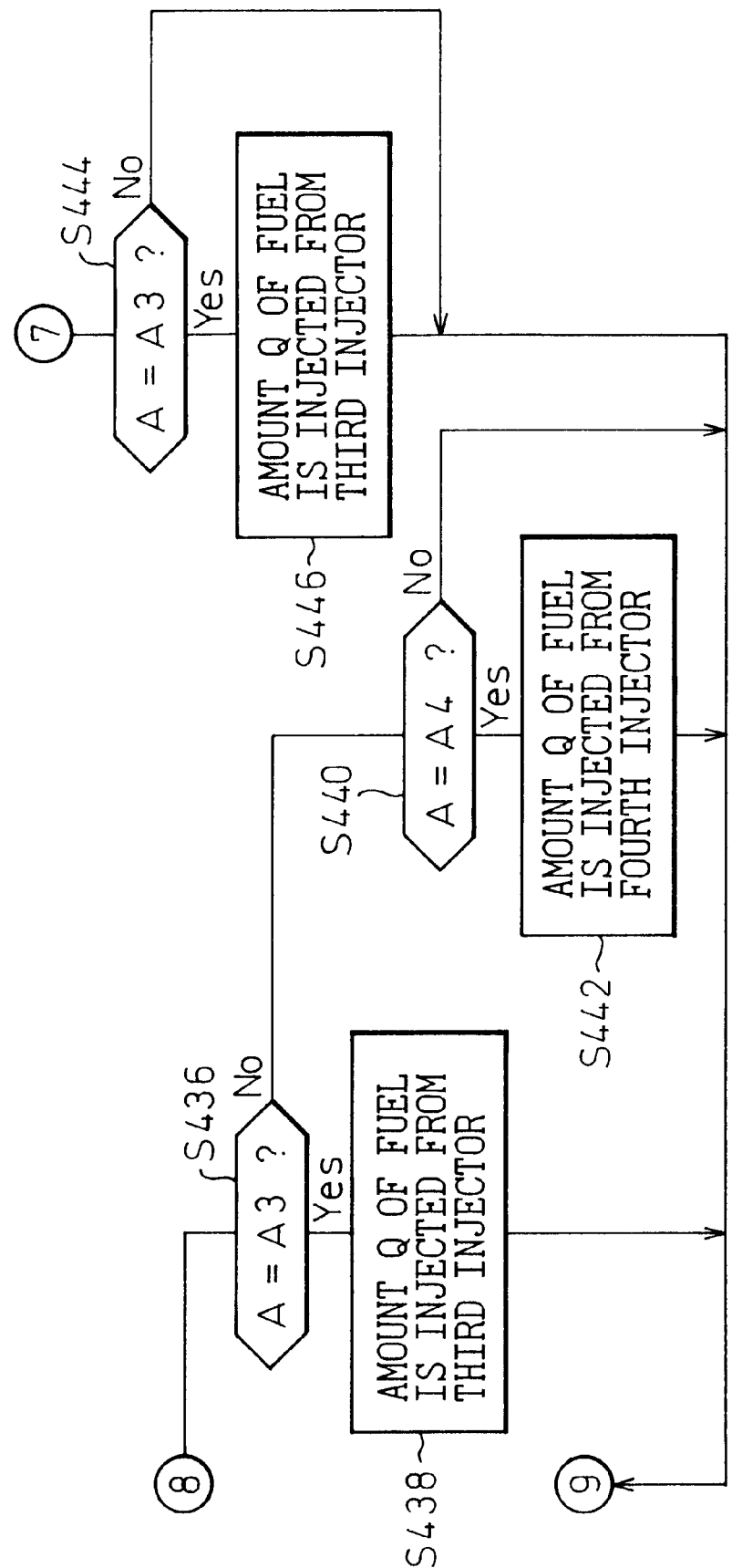
FIG. 10 is part of the flowchart of the operation of the post injection according to the second embodiment.

At step 444 in FIG. 10, it is judged if the present crank angle A is the third predetermined post crank angle A3 (A=A3). When A=A3, the routine proceeds to step 446 where the post injection is operated in the third cylinder #3 to inject the predetermined fuel amount Q of the fuel from the third injector 2c, and the routine is ended. On the other hand, when A≠A3, the routine is ended.

At step 414, it is judged if the first amount $Q_1$ of the fuel is larger than the predetermined maximum fuel amount $Q_0$ as described above ($Q_1>Q_0$). When $Q_1>Q_0$, it is judged that the divided first amount $Q_1$ should be injected in each cylinder, the routine proceeds to step 416 where the EGR control valve 16 is closed to avoid the introduction of the fuel into the intake air with the recirculated exhaust gas, the routine proceeds to step 418 where the first amount $Q_1$ of the fuel divided into four is input into the predetermined fuel amount Q, and the routine proceeds to step 420. On the other hand, when $Q_1 \leq Q_0$, the routine proceeds to step 428 where the first amount $Q_1$ of the fuel is input into the predetermined fuel amount Q, and the routine proceeds to step 434. Step 434 and steps thereafter is already explained above. Therefore, an explanation thereof will not be given.

At step 420, it is judged if the present crank angle A is the first predetermined post crank angle A1 (A=A1). When A=A1, the routine proceeds to step 422 where the post injection is operated in the first cylinder #1 to inject the predetermined fuel amount Q of the fuel from the first injector 2a, and the routine is ended. On the other hand, when A≠A1, the routine proceeds to step 424.

At step 424, it is judged if the present crank angle A is the second predetermined post crank angle A2 (A=A2). When A=A2, the routine proceeds to step 426 where the post injection is operated in the second cylinder #2 to inject the predetermined fuel amount Q of the fuel from the second injector 2b, and the routine is ended. On the other hand, when A≠A2, the routine proceeds to step 436 in FIG. 10.

At step 436, it is judged if the present crank angle A is the third predetermined post crank angle A3 (A=A3). When A=A3, the routine proceeds to step 438 where the post injection is operated in the third cylinder #3 to inject the predetermined fuel amount Q of the fuel from the third injector 2c, and the routine is ended. On the other hand, when A≠A3, the routine proceeds to step 440.

At step 440, it is judged if the present crank angle A is the fourth predetermined post crank angle A4 (A=A4). When A=A4, the routine proceeds to step 442 where the post injection is operated in the fourth cylinder #4 to inject the predetermined fuel amount Q of the fuel from the fourth injector 2d, and the routine is ended. On the other hand, when A≠A4, the routine is ended.

An operation of a post injection according to the third embodiment will be explained below. The structure of the engine and the pilot and main injections in third embodiment are the same as those in the first embodiment. Therefore, an explanation thereof will not given.

In the first embodiment, when it is judged that the temperature in cylinder is lower than the predetermined minimum cylinder temperature, the post injection is stopped. Therefore, no fuel is fed to the $NO_X$ catalyst so that the effect of the purification of the exhaust gas is totally decreased. According to the third embodiment, the effect of the purification of the exhaust gas is kept larger than that of the first embodiment.

The earlier the timing in the power and the exhaust strokes of the engine, the higher the temperature in the cylinder is. According to the third embodiment, when it is judged that the temperature in cylinder is lower than the predetermined minimum cylinder temperature, the post injection is operated at a timing earlier than the basic post injection timing to expose the fuel injected by the post injection to the high temperature of the cylinder in such a manner that the adherence of the fuel to the inner wall of the cylinder is restricted.

The operation of the post injection according to the third embodiment will be explained in detail, by referring the flowchart in FIGS. 11 and 12.

Figure 11:
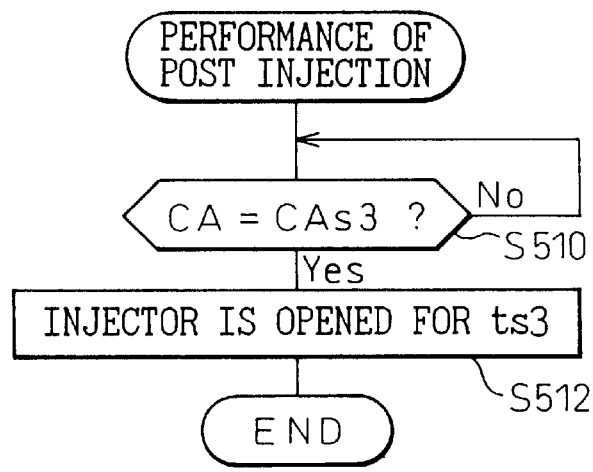
FIG. 11 is a flowchart of the operation of the post injection according to the third embodiment of the invention.

According to the third embodiment, the post injection is operated as shown in FIG. 11. At step 510, it is judged that the present crank angle CA is the predetermined post crank angle CAs3 (CA=CAs3). When CA=CAs3, it is judged that the post injection should be operated in the third cylinder #3, the routine proceeds to step 512 where the injector is operated for the post period ts3 calculated as described below, and the routine is ended. On the other hand, when CA≠CAs3, it is judged that no post injection should be operated in the third cylinder #3, the routine returns to step 510, and the routine is repeated until it is judged that CA=CAs3.

Figure 12:
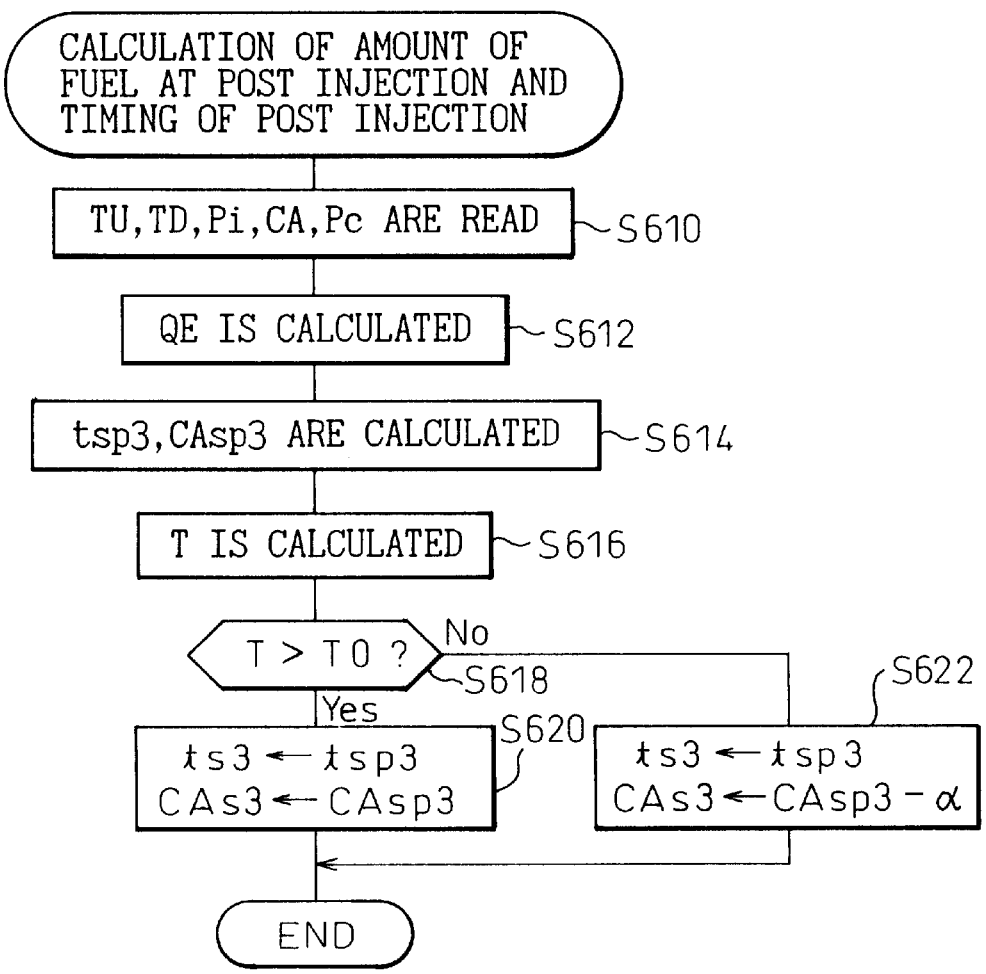
FIG. 12 is a flowchart of the calculation of the amount of the fuel injected by the post injection and the timing of the post injection according to the third embodiment.

According to the third embodiment, the amount of the fuel to be injected by the post injection and the timing at which the post injection should be operated, i.e., the predetermined post crank angle CAs3 are calculated as shown in FIG. 12. At step 610, read are the upstream and downstream temperature TU and TD of the $NO_X$ catalyst 12 detected by the upstream and downstream temperature sensors 13 and 14, respectively, the pressure Pi of the intake air detected by the intake air pressure sensor 5, the present crank angle CA detected by the crank angle sensor 6 and the pressure Pc of the fuel in the common rail 30 detected by the fuel pressure sensor 32, and the routine proceeds to step 612. As described above, the engine speed is calculated on the basis of the detected present crank angle CA.

At step 612, the amount of the exhaust gas passing through the $NO_X$ catalyst 12 per unit time QE (hereinafter referred to as "exhaust gas flow rate") is calculated on the basis of the intake air pressure Pi and the calculated engine speed, and the routine proceeds to step 614.

As described above, HC adsorbs on the $NO_X$ catalyst 12 to be activated, and then purifies the $NO_X$ with the activated HC. Therefore, it takes a length of a period to purify the exhaust gas in the $NO_X$ catalyst 12. Thus, the exhaust gas to be purified should be in the $NO_X$ catalyst 12 for a length of the period. The length of the period depends on the exhaust gas flow rate. The smaller the exhaust gas flow rate is, the shorter the length of the period is. Therefore, the shorter the length of the period is, the smaller the amount of the fuel which can react on the $NO_X$ is. According to the third embodiment, the smaller the exhaust gas flow rate is, the smaller the amount of the fuel to be injected by the post injection to purify the exhaust gas in the $NO_X$ catalyst 12 is.

As described above, at step 614, the post period tsp3 for opening the third injector 2c to inject the amount of the fuel calculated as described above is calculated on the basis of the exhaust gas flow rate QE and the fuel pressure Pi.

As described above, the $NO_X$ catalyst 12 has the range of the temperature in that the $NO_X$ catalyst 12 can purify the exhaust gas. Further, the rate of the purification of the exhaust gas in the $NO_X$ catalyst (hereinafter, referred to as "the purification rate") depends on the temperature of the $NO_X$ catalyst 12. The lower the purification rate is, the larger the amount of the high reactive HC needed to suitably purify the exhaust gas is. The HC becomes reactive when the HC is heat-dissolved. Therefore, the higher the temperature in the cylinder which exposes to the HC is, the larger the amount of the high reactive HC generated is. Thus, the amount of the high reactive HC depends on the temperature in the cylinder which exposes to the HC, i.e., the timing of the post injection.

Therefore, at step 614, the timing of the post injection, i.e., the post crank angle CAsp3 (hereinafter, referred to as "the basic post crank angle") at which the post injection should be operated is calculated on the basis of the upstream and downstream temperature TU and TD of the $NO_X$ catalyst 12, and the routine proceeds to step 616. In this step, the larger the amount of the high reactive HC needed, the earlier the basic post crank angle is.

At step 616, the temperature T of the third cylinder #3 is calculated on the basis of the upstream temperature TU of the $NO_X$ catalyst 12, and the routine proceeds to step 618.

At step 618, it is judged that the temperature T in the third cylinder #3 is higher than the predetermined minimum cylinder temperature T0 (T>T0). When T>T0, the routine proceeds to step 620 where the post period tsp3 and the basic post crank angle tsp3 are input into the predetermined post period ts3 and the predetermined post crank angle CAs3, respectively, and the routine is ended. On the other hand, when T<T0, the routine proceeds to step 622 where the post period tsp3 is input into the predetermined post period ts3, and a crank angle earlier than the basic post crank angle CAsp3 by a predetermined crank angle a is input into the predetermined post crank angle CAs3, and the routine is ended. The predetermined crank angle α is higher than zero.

An operation of a post injection according to the fourth embodiment will be explained below. The structure of the engine and the pilot and main injections in fourth embodiment are the same as those in the first embodiment. Therefore, an explanation thereof will not given.

In the third embodiment, when the temperature in the third cylinder #3 is lower than the predetermined minimum cylinder temperature, the timing of the post injection is changed to become early independently of the position of the piston in the third cylinder #3. The closer to the bottom dead center (BDC) of the power stroke the position of the piston in the cylinder is, the larger the area of the face of the inner wall of the cylinder which exposes to an interior of the cylinder. Therefore, the closer to the BDC the position of the piston in the cylinder is, the larger the amount of the fuel which can adhere to the inner wall of the cylinder. Therefore, according to the third embodiment, there is a possibility to increase the amount of the fuel adhering to the inner wall of the cylinder when the timing of the post injection is changed.

According to the fourth embodiment, when it is judged that the position of the piston becomes close to the BDC if the timing of the post injection is changed to become early, the timing of the post injection is changed to become late. When the timing of the post injection is changed to become late, the area of the inner wall of the cylinder becomes small. Therefore, the amount of the fuel adhering to the inner wall of the cylinder becomes small.

Figure 13:
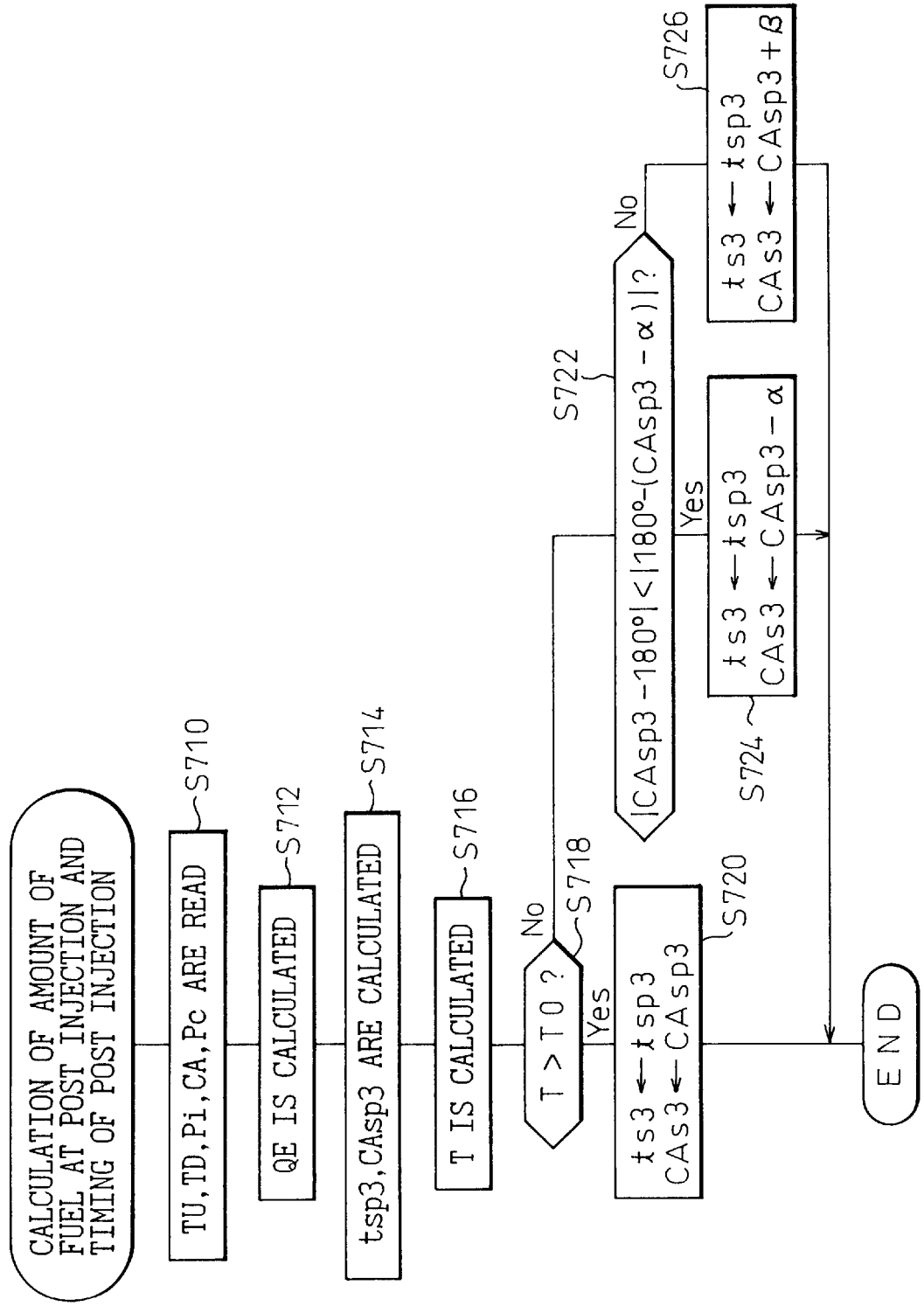
FIG. 13 is a flowchart of the calculation of the amount of the fuel injected by the post injection and the timing of the post injection according to the fourth embodiment of the invention.

The operation of the post injection according to the fourth embodiment will be explained in detail, by referring the flowchart in FIG. 13. Steps 710 to 720 in FIG. 13 correspond to step 610 to 620 in FIG. 12, respectively. Therefore, an explanation thereof will not be given.

When T≦TO at step 718, the routine proceeds to step 722 where it is judged if the difference |CAsp3−180 degree| between the basic post crank angle CAsp3 and the BDC 180 degree is smaller than the difference |180 degree−(CAsp3−α)| between the BDC 180 degree and the changed basic post crank angle CAsp3−α(|CAsp3−180 degree|<|180 degree−(CAsp3−α)|). When |CAsp3−180 degree|<|180 degree−(CAsp3−α)|, the routine proceeds to step 724 where the post period tsp3 is input into the predetermined post period ts3, and a crank angle earlier than the basic post crank angle CAsp3 by a first predetermined crank angle a is input into the predetermined post crank angle CAs3, and the routine is ended. On the other hand, when |CAsp3−180 degree|>|180 degree−(CAsp3−α)|, the routine proceeds to step 726 where the post period tsp3 is input into the predetermined post period ts3, and a crank angle later than the basic crank angle CAsp3 by a second predetermined post crank angle B is input into the predetermined post crank angle CAs3, and the routine is ended.

An operation of a post injection according to the fifth embodiment will be explained below. The structure of the engine and the pilot and main injections in fifth embodiment are the same as those in the first embodiment. Therefore, an explanation thereof will not given.

In the fourth embodiment, the post injection is operated independently of the pressure of the fuel in the common rail. However, when the pressure of the fuel in the common rail is high, the larger amount of the fuel is injected by the post injection. Therefore, when the pressure of the fuel in the common rail is high, the large amount of the fuel may adhere to the inner wall of the cylinder.

According to the fifth embodiment, when the pressure of the fuel in the common rail is high, the timing of the post injection is changed to become early in such a manner that the fuel injected by the post injection is exposed to the high temperature in the cylinder. Therefore, if the fuel is injected into the cylinder by the post injection when the pressure of the fuel in the common rail is high, the fuel is exposed to the high temperature in the cylinder so that the fuel can evaporate during the flowing of the fuel in the cylinder. Thus, the amount of the fuel which may adhere to the inner wall of the cylinder is decreased.

Figure 14:
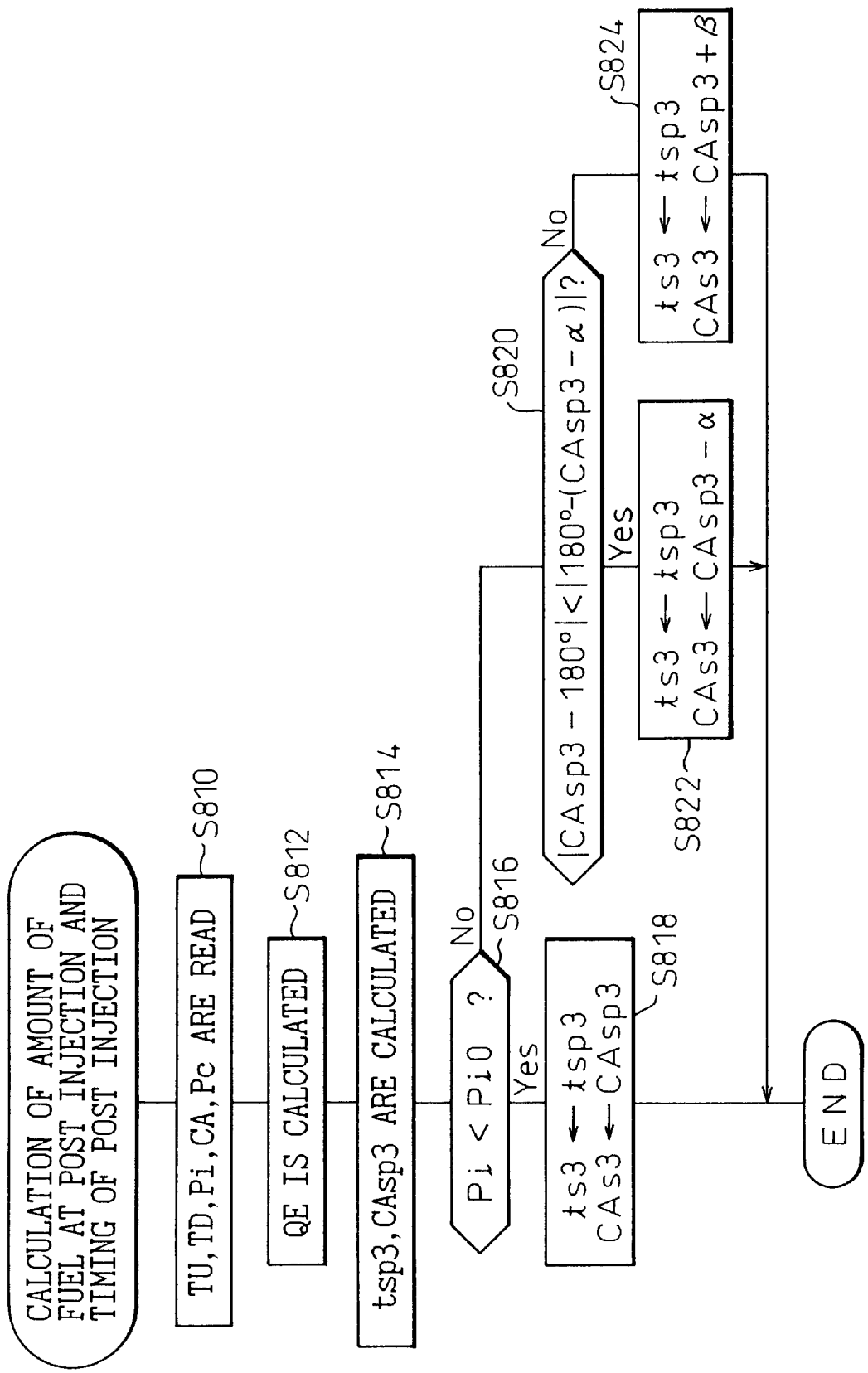
FIG. 14 is a flowchart of the calculation of the amount of the fuel injected by the post injection and the timing of the post injection according to the fifth embodiment of the invention.

The operation of the post injection according to the fifth embodiment will be explained in detail, by referring the flowchart in FIG. 14. Steps 810 to 814 in FIG. 14 correspond to steps 710 to 714 in FIG. 13, respectively. Therefore, an explanation thereof will not be given.

At step 816, it is judged if the pressure of the fuel in the common rail Pi is lower than a predetermined maximum fuel pressure Pi0 (Pi<Pi0). When Pi<Pi0, the routine proceeds to step 818. Step 818 in FIG. 14 corresponds to step 720. Therefore, an explanation thereof will not be given.

On the other hand, when Pi≧Pi0, the routine proceeds to step 820. Steps 820 to 824 in FIG. 14 corresponds to steps 722 to 726, respectively. Therefore, an explanation thereof will not be given.

Alternatively, in the fifth embodiment, for simplifying the routine, when the pressure of the fuel in the common rail is higher than the predetermined maximum fuel pressure and the basic timing of the post injection is during the power stroke, the basic timing of the post injection is changed to become early. On the other hand, when the pressure of the fuel in the common rail is lower than the predetermined maximum fuel pressure and the basic timing of the post injection is during the exhaust stroke, the basic timing of the post injection is changed to become late.

An operation of a post injection according to the sixth embodiment will be explained below. The structure of the engine and the pilot and main injections in the sixth embodiment are the same as those in the first embodiment. Therefore, an explanation thereof will not given.

In the first embodiment, the operation of the post injection is controlled on the basis of the temperature of the cooling water detected by the water temperature sensor. Therefore, if the water temperature sensor is deteriorated, the operation of the post injection is not suitably controlled.

According to the sixth embodiment, when the water temperature sensor is deteriorated, the temperature in the cylinder is calculated on the basis of the temperature of the engine oil detected by the oil temperature sensor. Further, when the oil temperature sensor is deteriorated, the temperature in the cylinder is calculated on the basis of the temperature of the upstream temperature of the upstream end of the $NO_X$ catalyst detected by the upstream temperature sensor. Further, when the upstream temperature sensor is deteriorated, the temperature in the cylinder is calculated on the basis of the period of the driving of the engine. The longer the period of the driving of the engine is, the higher it is judged that the temperature in the cylinder is. Therefore, according to the sixth embodiment, the suitable control of the operation of the post injection is ensured.

Figure 15:
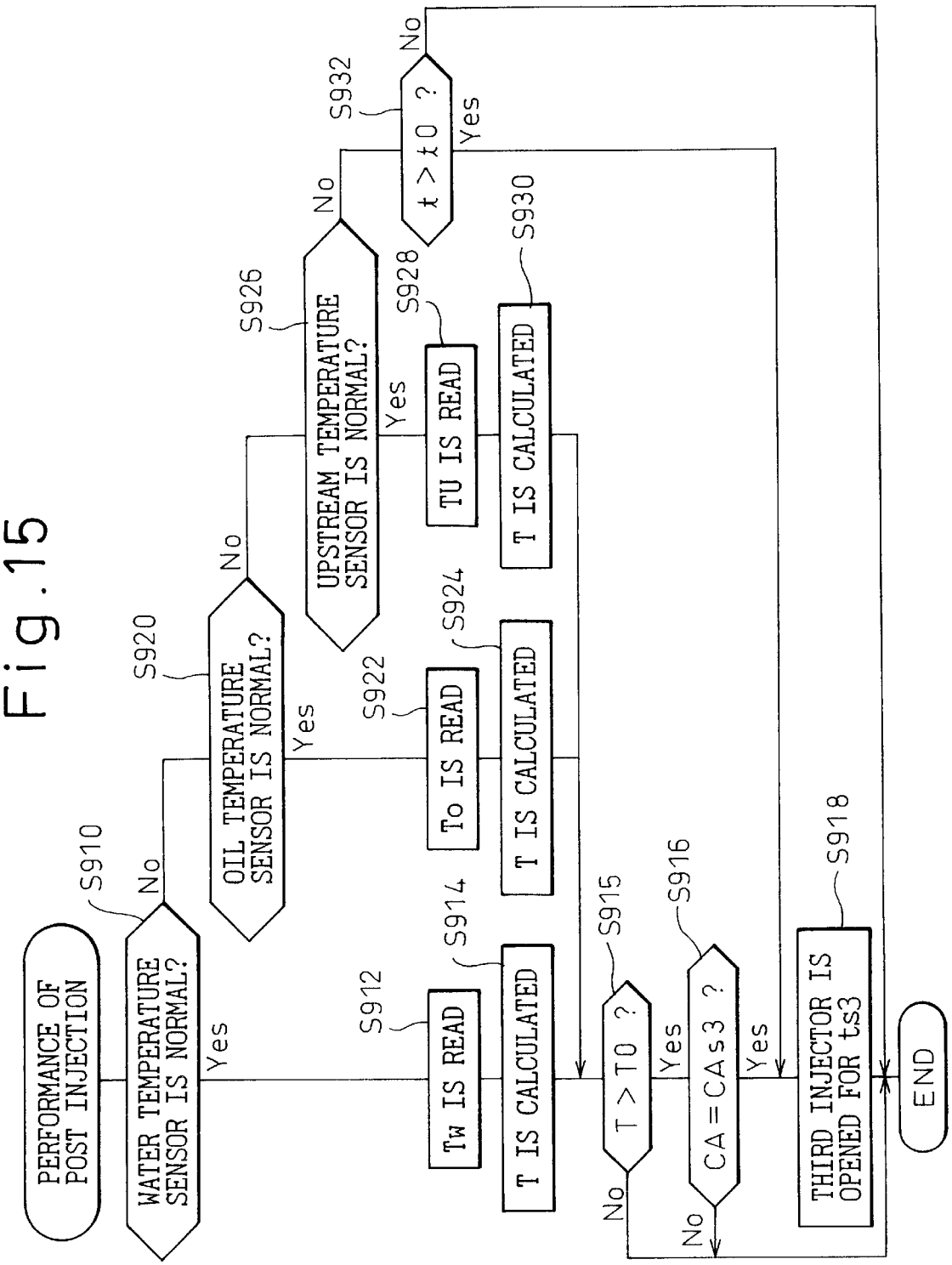
FIG. 15 is a flowchart of the operation of the post injection according to the sixth embodiment of the invention.

The operation of the post injection according to the sixth embodiment will be explained in detail, by referring the flowchart in FIG. 15.

At step 910, it is judged if the water temperature is normal. When the water temperature sensor is normal, the routine proceeds to step 912 where the temperature of the cooling water detected by the water temperature sensor is read, the routine proceeds to step 914 where the temperature in the cylinder is calculated, and the routine proceeds to step 915. On the other hand, when the water temperature sensor is deteriorated, the routine proceeds to step 920.

At step 920, it is judged if the oil temperature sensor is normal. When the oil temperature sensor is normal, the routine proceeds to step 922 where the temperature of the engine oil detected by the oil temperature sensor is read, the routine proceeds to step 924 where the temperature in the cylinder is calculated, and the routine proceeds to step 915. On the other hand, when the oil temperature sensor is deteriorated, the routine proceeds to step 926.

At step 926, it is judged if the upstream temperature sensor 13 is normal. When the upstream temperature sensor is normal, the routine proceeds to step 928 where the temperature of the upstream end of the $NO_X$ catalyst 12 detected by the upstream temperature sensor 13 is read, the routine proceeds to step 930 where the temperature in the cylinder is calculated, and the routine proceeds to step 915. On the other hand, when the upstream temperature sensor 13 is deteriorated, the routine proceeds to step 932.

At step 932, it is judged if the period t of the operation of the engine is longer than a predetermined minimum during period T0 (t>t0). When t>t0, it is judged that the temperature in the cylinder is higher than the predetermined minimum cylinder temperature, the routine proceeds to step 918 where the third injector 2c is operated for the post period ts3 calculated as described below, and the routine is ended. On the other hand, when t≦t0, it is judged that the temperature in the cylinder is lower than the predetermined minimum cylinder temperature, the routine is ended.

At step 915, it is judged that the temperature T in the third cylinder is higher than the predetermined minimum cylinder temperature T0 (T>T0). When T>T0, the routine proceeds to step 916. On the other hand, when T≦T0, the routine is ended.

At step 916, it is judged that the present crank angle CA is the predetermined post crank angle CAs3 (CA=CAs3) to operate the third injector 2c in the third cylinder #3. When CA=CAs3, the routine proceeds to step 918 where the third injector 2c is operated for the post period ts3, and the routine is ended. On the other hand, CA≠CAs3, the routine is ended.

Figure 16:
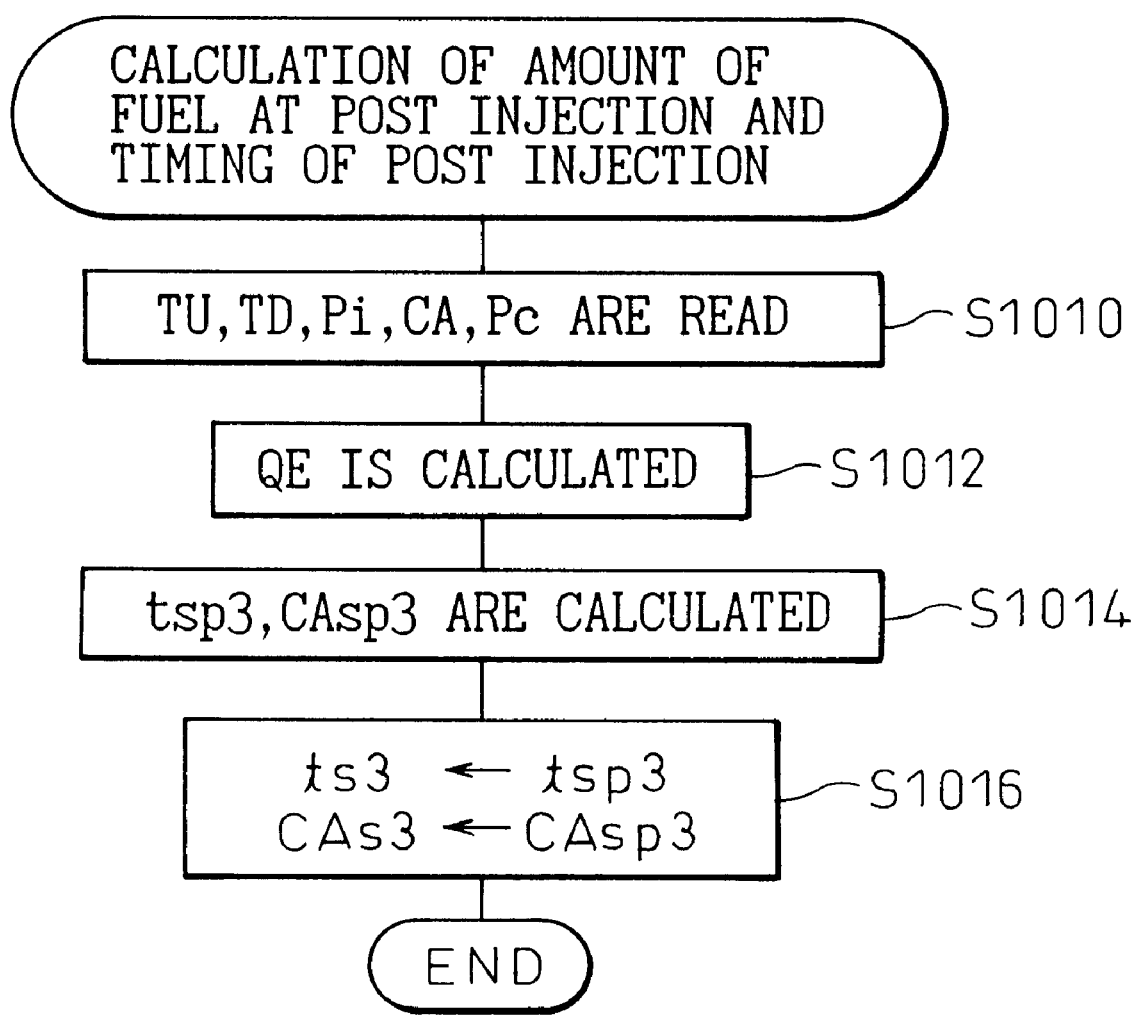
FIG. 16 is a flowchart of the calculation of the amount of the fuel injected by the post injection and the timing of the post injection according to the seventh embodiment of the invention.

A calculation of the amount of the fuel injected by the post injection and the timing of the post injection according to the sixth embodiment will be explained in detail, by referring the flowchart in FIG. 16.

At step 1010, read are the upstream and downstream temperatures TU and TD of the $NO_X$ catalyst 12 detected by the upstream and downstream temperature sensors 13 and 14, respectively, the pressure Pi of the intake air detected by the intake air pressure sensor 5, the present crank angle CA detected by the crank angle sensor 6 and the pressure Pc of the fuel in the common rail 30 detected by the fuel pressure sensor 32, and the routine proceeds to step 1012. As described above, the engine speed is calculated on the basis of the detected present crank angle CA.

At step 1012, the exhaust gas flow rate QE is calculated on the basis of the intake air pressure Pi and the calculated engine speed, and the routine proceeds to step 1014.

At step 1014, the post period tsp3 for opening the third injector 2c to inject the amount of the fuel is calculated on the basis of the exhaust gas flow rate QE and the intake air pressure Pi, and the basic post crank angle CAsp3 is calculated on the basis of the upstream and downstream temperatures TU and TD, and the routine proceeds to step 1016.

At step 1016, the post period tsp3 and the basic post crank angle tsp3 are input into the predetermined post period ts3 and the predetermined post crank angle CAs3, respectively, and the routine is ended.

An engine according to the seventh embodiment will be explained below. An engine shown in FIG. 17 comprises a fuel pump (a rotary supply pump) 52 for pumping the fuel from a fuel supply source such as a fuel tank 51 to discharge the fuel therefrom under a predetermined pumping pressure, and a fuel storing chamber, i.e., a common rail 53 for receiving the fuel discharged from the fuel pump 51 to store the fuel therein under a predetermined fuel pressure.

A plurality of fuel supply passages 54 are connected to the common rail 53. The fuel supply passages 54 are connected to a plurality of the fuel injectors 55, respectively which are mounted on the engine. For example, if the engine has six cylinders and single fuel injector is provided in each cylinder, the fuel injectors are six, and the fuel supply passages 54 are six.

A fuel pressure sensor 56 is provided in the common rail 53 for detecting the pressure of the fuel in the common rail 53. The fuel pressure sensor 56 is connected to the electronic control unit (ECU) 57.

The ECU 57 is connected to an accelerator pedal sensor S1, an intake air pressure sensor S2, a water temperature sensor S3, an engine speed sensor S4, an airflow meter S5 for detecting the amount of the intake air, a G sensor S6 for detecting an inertia in the vehicle, and some sensors necessary to control the vehicle.

The ECU 57 comprises a fuel pump control unit 58 for controlling the operation of the fuel pump, and a fuel injector control unit 59 for controlling the operation of the fuel injectors. These units 8 and 9 control the operations of the fuel pump 52 and the fuel injectors 55 according to the engine driving condition determined by the output from the sensors such as the engine speed sensor and the accelerator pedal sensor described above.

Figure 20:
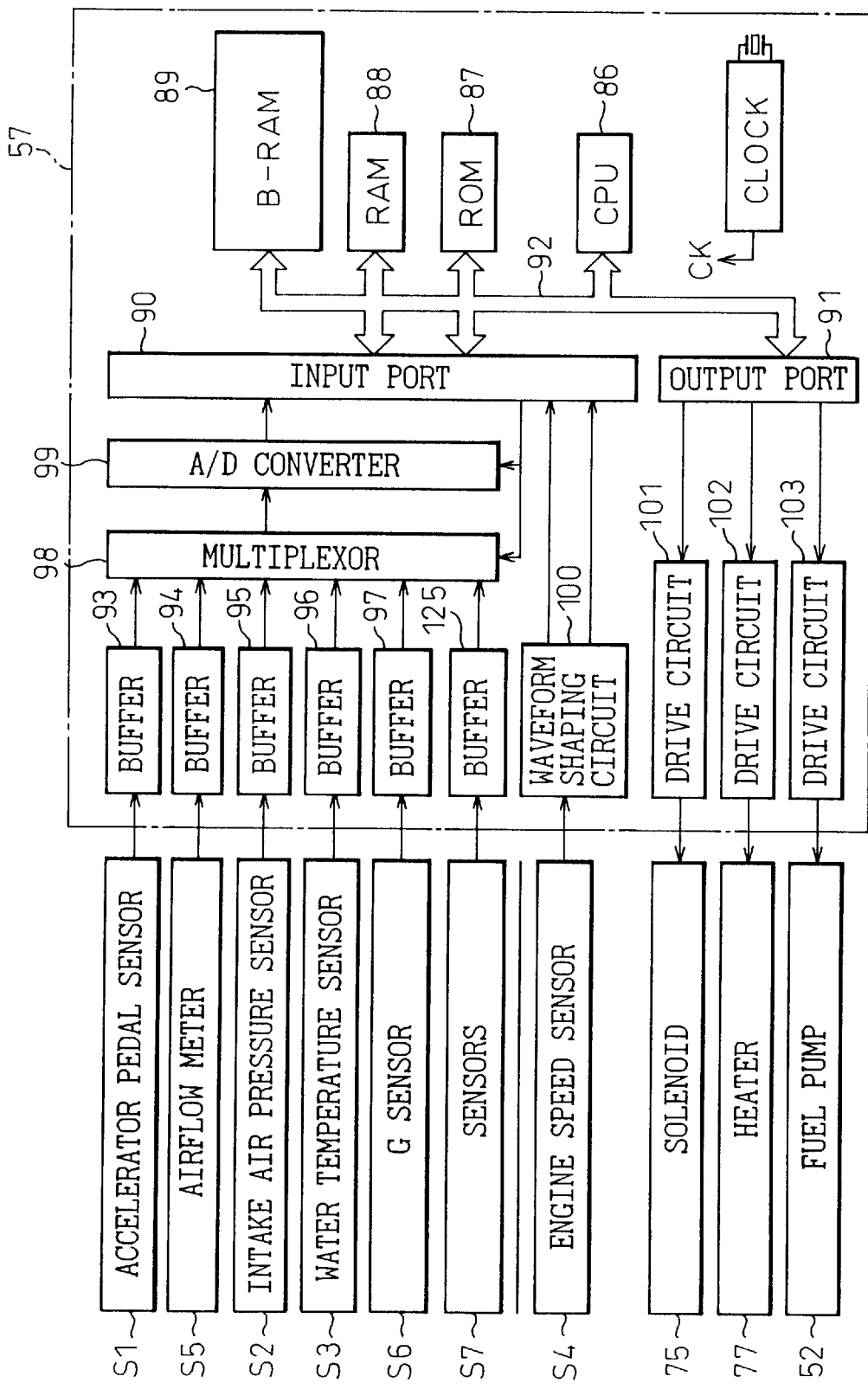
FIG. 20 is an electronic control unit according to the eighth embodiment.

As shown in FIG. 20, the ECU 57 comprises the CPU 86, the ROM 87, the RAM 88, the B-RAM 89, the input port 90, and the output port 91. These components are connected by the bilateral bus 92. The accelerator pedal sensor S1, the airflow meter S5, the intake air pressure sensor S2, the water temperature sensor S3, the G sensor S6, and the sensors S7 including an engine oil temperature sensor, a cooling water sensor, an intake air temperature sensor and a compressed gas temperature sensor are connected to the input port 90 via buffers 93 to 97 and 125, a multiplexer 98 and an AD converter 99. The engine speed sensor S4 is connected to the input port 90 via a wave form shaping circuit 90.

The engine oil temperature sensor, the cooling water sensor, the intake air temperature sensor, the compressed gas temperature sensor, and the engine speed sensor correspond to means for detecting the temperature in the cylinder.

The larger the amount of the fuel injected by the main injection is, the higher the temperature in the cylinder is. Therefore, the temperature in the cylinder may be calculated on the basis of the amount of the fuel injected by the main injection.

In the seventh embodiment, the fuel pump 52 discharges the fuel to the common rail 53 when the pressure of the fuel in the common rail 53 is lower than the predetermined target fuel pressure. On the other hand, when the pressure of the fuel in the common rail 53 is higher than the predetermined target fuel pressure, the fuel pump 52 is stopped. Therefore, the feed back control of the ECU 57 is operated in such a manner that the pressure of the fuel in the common rail 53 is kept at a predetermined target fuel pressure during a constant engine driving condition.

A relief valve 61 is mounted in a fuel relief passage 62. The fuel relief passage 62 connects the common rail 53 to the fuel tank 51. The relief valve 61 relieves the fuel from the common rail 53 to the fuel tank 51 to decrease the pressure in the common rail 53 when it is judged that the pressure in the common rail 53 is higher than a predetermined maximum fuel pressure which is higher than the predetermined target fuel pressure.

Figure 18:
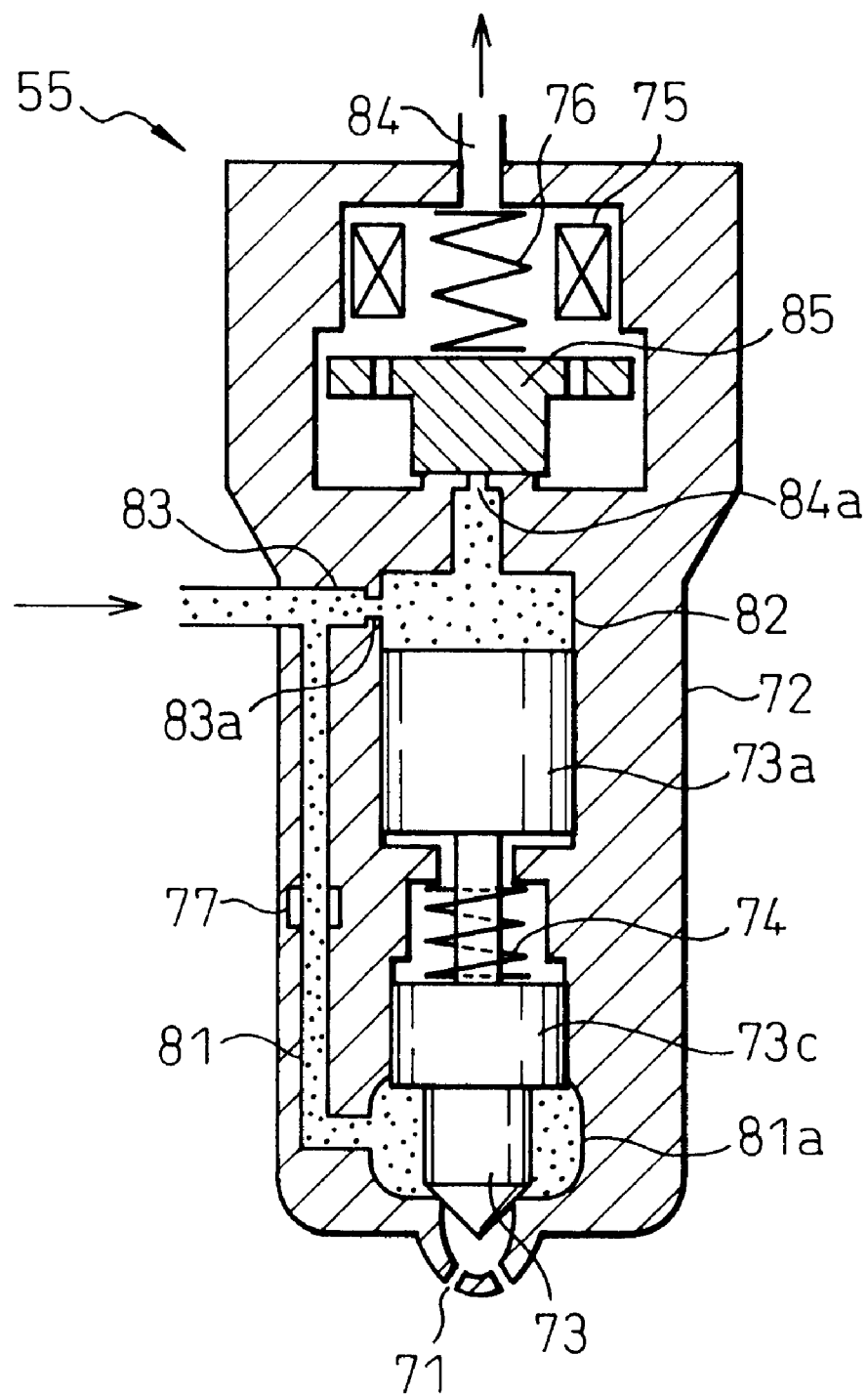
FIG. 18 is a cross sectional view of a fuel injector according to the eighth embodiment.

As shown in FIG. 18, the fuel injector comprises a cylindrical body 72 having a fuel injection hole 71 at its tip, a needle valve 73 movably inserted in the cylindrical body 72, and a coil spring 74 for biasing the needle valve 73 to close the fuel injection hole 71.

Further, the fuel injector comprises a first fuel supply passage 81 for introducing the fuel discharged from the common rail under the high pressure to the fuel injection hole 71, a control chamber 72 for receiving the fuel discharged from the common rail to force the needle valve 73 toward the fuel injection hole 71 to close the same, a second fuel supply passage 83 for connecting the first fuel supply passage 81 to the control chamber 72, and a fuel discharging passage 84 for discharging the fuel from the control chamber 72 to decrease the pressure of the fuel in the control chamber 72.

An inlet orifice 83a for determining the rate of the fuel which flows into the control chamber 82 is formed in the second fuel supply passage 83. Further, an outlet orifice 84a for determining the rate of the fuel which is discharged from the control chamber 82 is formed in the fuel discharging passage 84. The area of the cross section of the outlet orifice 84a is larger than that of the inlet orifice 83a. For example, the ratio of the areas of the cross sections between the inlet orifice 83a and the outlet orifice 84a is 2:3.

The needle valve 73 has main and sub pistons 73a and 73c which are connected. The main piston 73a has an end face which faces the control chamber 82. When the end face of the main piston 73a receives a pressure of the fuel in the control chamber 82, the needle valve 73 is forced to move toward the fuel injection hole 71. The sub piston 73c is positioned at the fuel injection hole side in the cylindrical body 72.

A fuel reservoir 81a is formed in the first fuel supply passage 31 adjacent to the fuel injection hole 71. The sub piston 73c has an end face which faces the fuel reservoir 81a. When the end face of the sub piston 73c receives a pressure of the fuel in the fuel reservoir 81a, the needle valve 73 is forced to move remote from the fuel injection hole 71. The area Ss of the end face of the sub piston 73c is smaller than that Sm of the end face of the main piston 73a.

A back pressure control valve 85 for normally closing the outlet orifice 84a is provided in the cylindrical body 72. The back pressure control valve 85 is an electromagnetic valve.

When the back pressure control valve 85 is closed, the fuel is not discharged from the control chamber 82 so that the pressure of the fuel in the control chamber 82 is kept higher than a predetermined minimum fuel pressure. The predetermined minimum fuel pressure is set sufficient to close the fuel injection hole by the needle valve. In the seventh embodiment, the combined force derived from the pressure of the fuel in the control chamber 82 when the pressure of the fuel in the control chamber 82 is kept high, and the biasing force of the coil spring is larger than that derived from the pressure of the fuel in the fuel reservoir 81a. Therefore, when the the pressure of the fuel in the control chamber 82 is kept high, the needle valve 73 closes the fuel injection hole 71.

When the back pressure control valve 85 is opened, the fuel is discharged from the control chamber 82 so that the pressure of the fuel in the control chamber 82 is decreased. When the pressure of the fuel in the control chamber 2 becomes smaller than the predetermined minimum fuel pressure, the needle valve 3 moves remote from the fuel injection hole 71 so that the fuel injection hole 71 is opened.

When the back pressure control valve 5 is closed after the fuel injection hole is opened, the pressure of the fuel in the control chamber 82 is increased. When the pressure of the fuel in the control chamber 82 becomes larger than the predetermined minimum fuel pressure, the needle valve 73 is forced to move toward the fuel injection hole 71 so that the fuel injection hole 71 is closed.

In the seventh embodiment, the force derived from the biasing force of the coil spring 74 is smaller than that derived from the pressure of the fuel in the fuel reservoir 81*a*.

The CPU 36 reads the outputs detected by the sensors input into the input port 90. The back pressure control sensor, the fuel pump 52 and etc. are connected to the output port 41 via drive circuits 51, 52, 53. The fuel injection control unit controls the back pressure control valve, the fuel pump 52 and etc. on the basis of the outputs read from the sensors.

A seat for needle valve 73 is formed in the cylindrical body 72. An inner wall face of the seat is tapered. A tip end of the needle valve 73 is tapered to have a conical shape.

When an area of a flow passage formed between the inner wall face of the seat and the tip end of the needle valve 73 is smaller than that of the fuel injection hole 71, the rate of the fuel injected from the injector is determined by the area of the flow passage. On the other hand, when the area of the flow passage is larger than that of the fuel injection hole 71, the rate of the fuel injected from the injector is determined by the area of the fuel injection hole 71.

Figure 19:
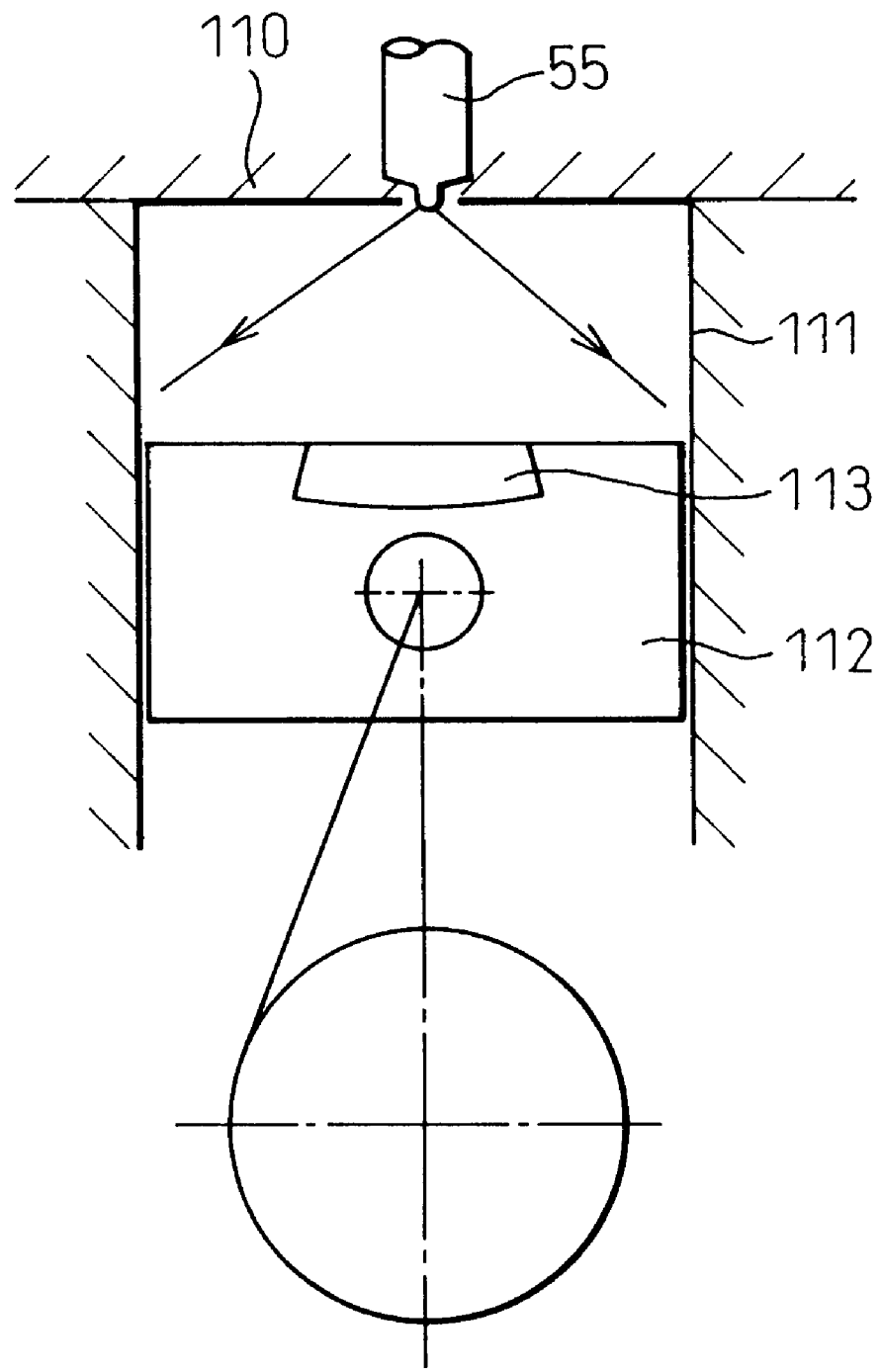
FIG. 19 is a view showing the positioning of the fuel injector according to the eighth embodiment.

As shown in FIG. 19, the fuel injector 75 is mounted on a cylinder head 110 in such a manner that the fuel injected from the fuel injector 75 directs toward the center of the piston 112. Alternatively, although the fuel injector 75 is on the axis of the piston, the fuel injector may be positioned out of the axis of the piston in such a manner the fuel injected from the fuel injector 75 directs toward the center of the piston 112.

A recess is formed in the top of the piston for receiving mixture gas including the fuel and the intake air.

The fuel injector control unit 59 controls the main and sub injectors. Particularly, the fuel injector control unit 59 controls one of the timing of the sub injection, the amount of the fuel injected by the sub injection, and the pressure of the injection of the fuel at the sub injection on the basis of the parameter associated with the amount of the fuel which may adhere to the inner wall of the cylinder. The sub injection includes the post injection and the injection which is operated prior to the main injection.

The parameter associated with the amount of the fuel which may adhere to the inner wall of the cylinder is at least one of the temperature in the cylinder associated with the temperatures of the engine oil, the cooling water, the intake air, and the compressed gas, the timing of the sub injection, the position of the piston in the cylinder, the amount of the fuel injected by the main injection, the crank angle, the pressure in the cylinder, and the concentration of the air in the cylinder.

An operation of a pilot injection according to the seventh embodiment will be explained below.

Figure 17:
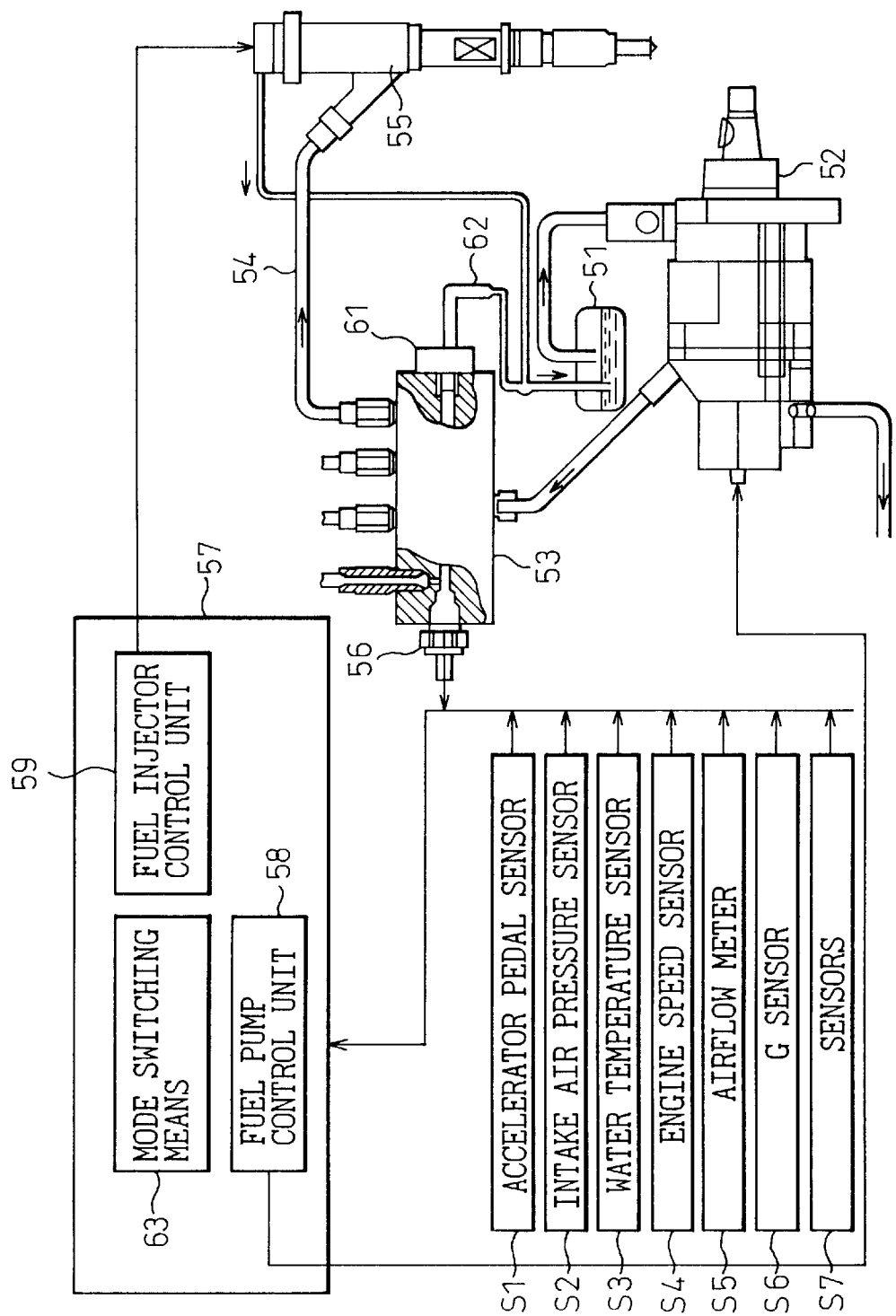
FIG. 17 is a view of an engine according to the eighth embodiment of the invention.

As shown in FIG. 17, the CPU 86 has mode switching means 53 therein. The mode switching means 53 selectively switches a normal injection mode to a pilot injection mode. In the normal injection mode, only the main injection is operated. On the other hand, in the pilot injection mode, the pilot and main injections are operated.

Figure 36:
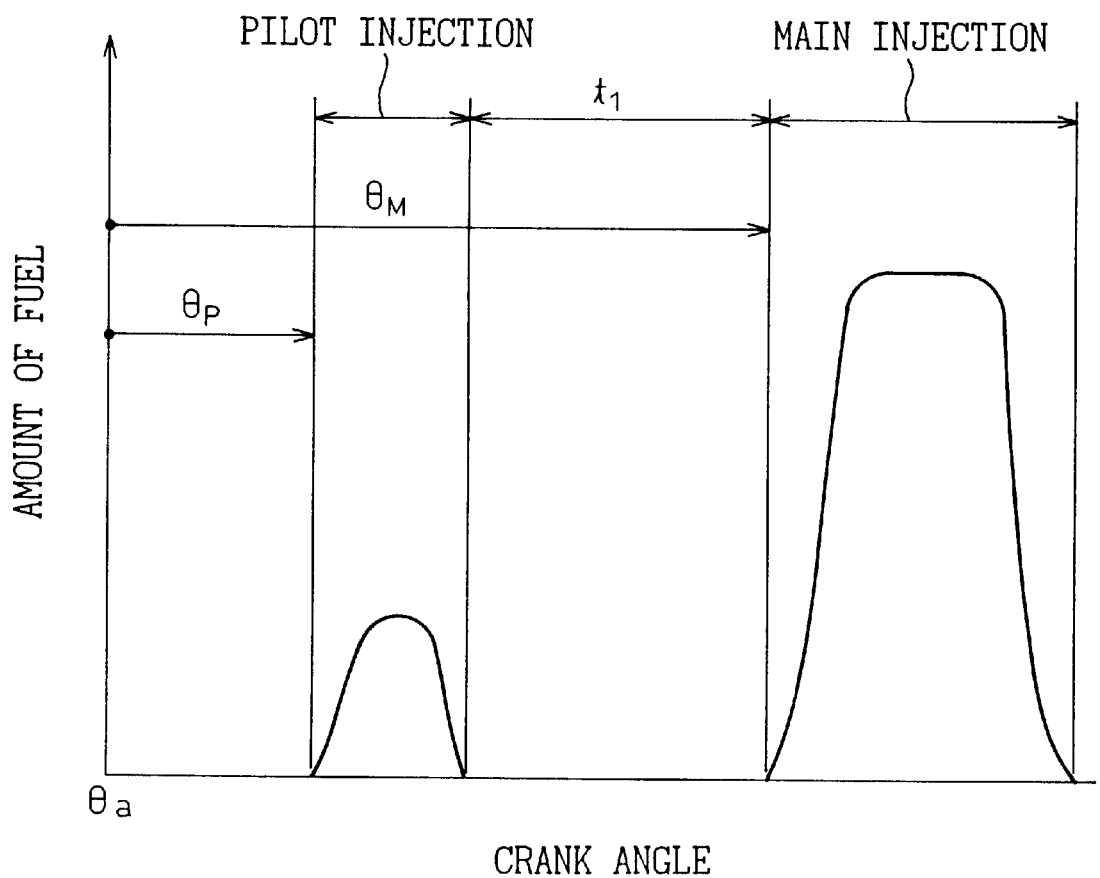
FIG. 36 is a view showing the relationship between the crank angle and the amount of the fuel injected by the pilot and main injections.

As shown in FIG. 36, when the mode switching means 53 switches the normal injection mode to the pilot injection mode, or vice versa, the fuel injection control means sets the interval of the operation of the pilot and main injections (hereinafter referred to as "the injection interval") by calculating the timing θp to start the operation of the pilot injection, the timing to stop the operation of the pilot injection, the timing θM to start the operation of the main injection, and the timing to stop the operation of the main injection on the basis of the present engine driving condition. These timings are that from the predetermined basic crank angle θa.

In the pilot mode, the interval of the operation of the pilot and main injections is set to a predetermined interval. On the other hand, in the normal mode, the interval of the operation of the pilot and main injections is set to zero.

Figure 21:
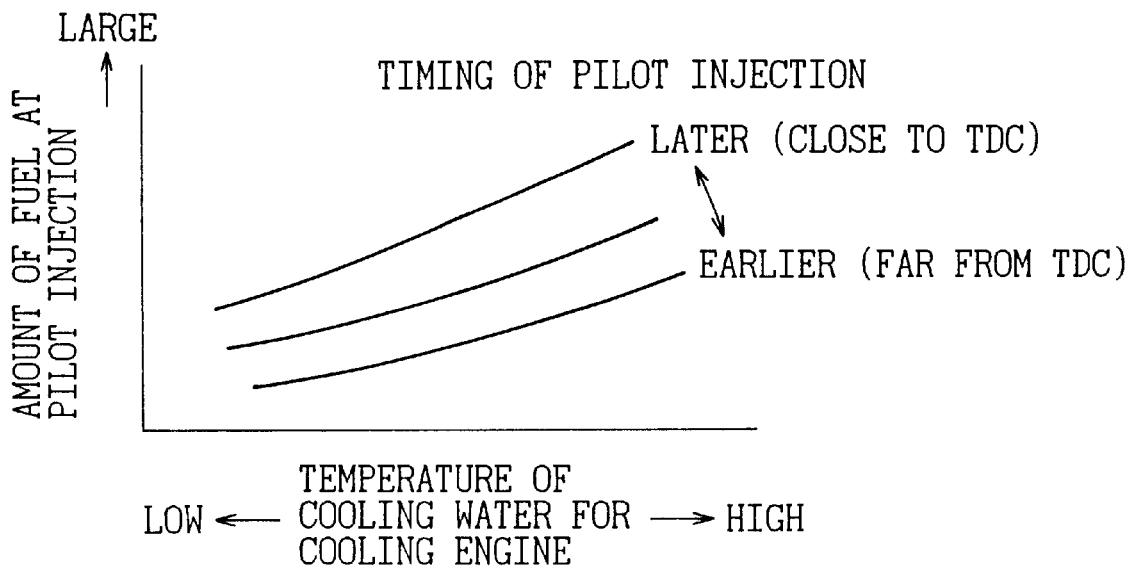
FIG. 21 is a map showing the relationship among the temperature of the cooling water, the amount of the fuel injected by the pilot injection, and the timing of the pilot injection according to the eighth embodiment.

The fuel injection control means comprises a map shown in FIG. 21. According to the map, the timing of the pilot injection is controlled on the basis of the temperature of the cooling water, and the amount of the fuel to be injected by the pilot injection.

The larger the amount of the fuel injected by the pilot injection is, the smaller the amount of the fuel burned in the cylinder is. According to the map, the larger the amount of the fuel to be injected by the pilot injection is, the later the timing of the pilot injection is, to decrease the area of the inner wall of the cylinder exposed to the injected fuel. Therefore, according to the seventh embodiment, when the amount of the fuel injected by the pilot injection is large, the timing of the pilot injection is late. Thus, the area of the inner wall of the cylinder exposed to the injected fuel is small so that an amount of the fuel adhering to the inner wall of the cylinder is kept small.

The lower the temperature of the cooling water is, the smaller the amount of the fuel burned in the cylinder is. According to the map, the lower the temperature of the cooling water is, the later the timing of the pilot injection is, to decrease the area of the inner wall of the cylinder exposed to the injected fuel. Therefore, according to the seventh embodiment, when the temperature in the cylinder at the pilot injection is low, the timing of the pilot injection is late. Thus, the area of the inner wall of the cylinder exposed to the injected fuel is small so that an amount of the fuel adhering to the inner wall of the cylinder is kept small.

Figure 22:
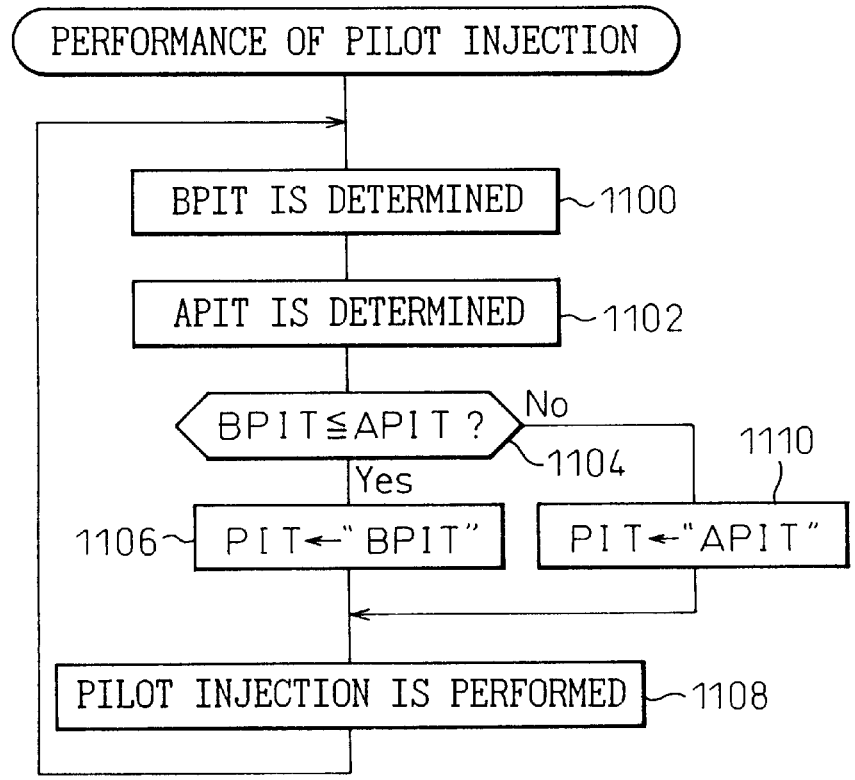
FIG. 22 is a flowchart of the operation of the pilot injection according to the eighth embodiment.

The operation of the pilot injection according to the seventh embodiment will be explained in detail, by referring the flowchart in FIG. 22.

At step 1100, the basic timing BPIT of the pilot injection and the injection interval in the pilot injection mode are determined on the basis of the engine driving condition, and the routine proceeds to step 1102 where the allowable timing APIT of the pilot injection is determined by reading the map on the basis of the temperature of the cooling water and the amount of the fuel to be injected by the pilot injection, and the routine proceeds to step 1104. The engine driving condition is determined on the basis of the engine speed and the amount of the depression of the accelerator pedal.

At step 1104, it is judged if the basic timing BPIT of the pilot injection is equal to or smaller than the allowable timing APIT of the pilot injection (BPIT≦APIT). When BPIT <APIT, the routine proceeds to step 1106 where the BPIT is input into the predetermined timing PIT of the pilot injection, and the routine proceeds to step 1108 where the pilot injection is operated, and the routine is ended. On the other hand, when BPIT>APIT, the routine proceeds to step 1110 where the APIT is input into the predetermined timing PIT of the pilot injection, and the routine proceeds to step 1108 where the pilot injection is operated, and the routine is ended.

An operation of a pilot injection according to the eighth embodiment will be explained below. The fuel injection control means of the eighth embodiment comprises a same map as shown in FIG. 21. According to the eighth embodiment, the amount of the fuel to be injected by the pilot injection is controlled on the basis of the timing of the pilot injection and the temperature of the cooling water.

The later the timing of the pilot injection is, the smaller the area of the inner wall of the cylinder exposed to the injected fuel is. Therefore, the later the timing of the pilot injection is, the larger the amount of the fuel to be injected by the the pilot injection can be. According to the map, the later the timing of the pilot injection is, the larger the maximum amount of the fuel to be injected by the pilot injection is. Therefore, according to the eighth embodiment, when the amount of the fuel to be injected by the pilot injection is large, the timing of the pilot injection is late. Thus, the area of the inner wall of the cylinder exposed to the injected fuel is small so that an amount of the fuel adhering to the inner wall of the cylinder is kept small.

Further, the higher the temperature of the cooling water is, the larger the amount of the fuel to be injected by the the pilot injection can be. According to the map, the higher the temperature of the cooling water is, the larger the maximum amount of the fuel to be injected by the pilot injection is. Therefore, according to the eighth embodiment, the injected fuel can be exposed to the high temperature in the cylinder sufficient to allow to burn the injected fuel. Thus, no injected fuel adheres to the inner wall of the cylinder.

Figure 23:
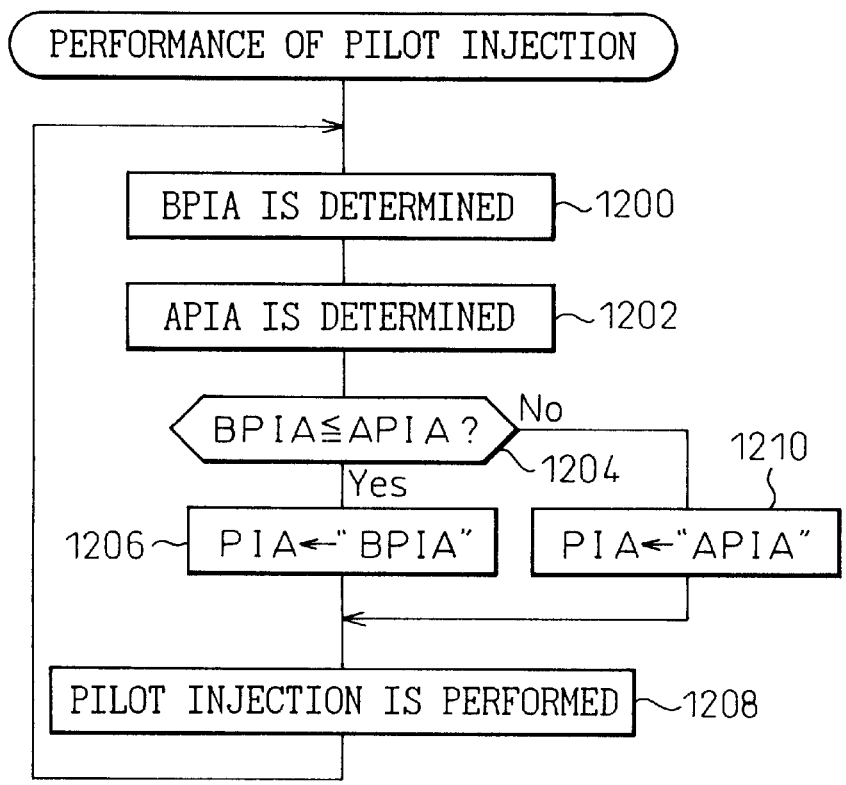
FIG. 23 is a flowchart of the operation of the pilot injection according to the ninth embodiment.

The operation of the pilot injection according to the eighth embodiment will be explained in detail by referring the flowchart in FIG. 23.

At step 1200, the basic amount BPIA of the fuel to be injected by the pilot injection and the injection interval in the pilot injection mode are determined on the basis of the engine driving condition, and the routine proceeds to step 1202 where the allowable amount APIA of the fuel to be injected by the pilot injection is determined by reading the map on the basis of the temperature of the cooling water and the timing of the pilot injection, and the routine proceeds to step 1204.

At step 1204, it is judged if the basic amount BPIA is equal to or smaller than the allowable amount APIA (BPIA≦APIA). When BPIA≦APIA, the routine proceeds to step 1206 where BPIA is input into the predetermined amount PIA of the fuel to be injected by the pilot injection, and the routine proceeds to step 1208 where the pilot injection is operated, and the routine is ended. On the other hand, when BPIA>APIA, the routine proceeds to step 1210 where the APIA is input into the predetermined amount PIA, and the routine proceeds to step 1208 where the pilot injection is operated, and the routine is ended.

An operation of a pilot injection according to the ninth embodiment will be explained below.

Figure 24:
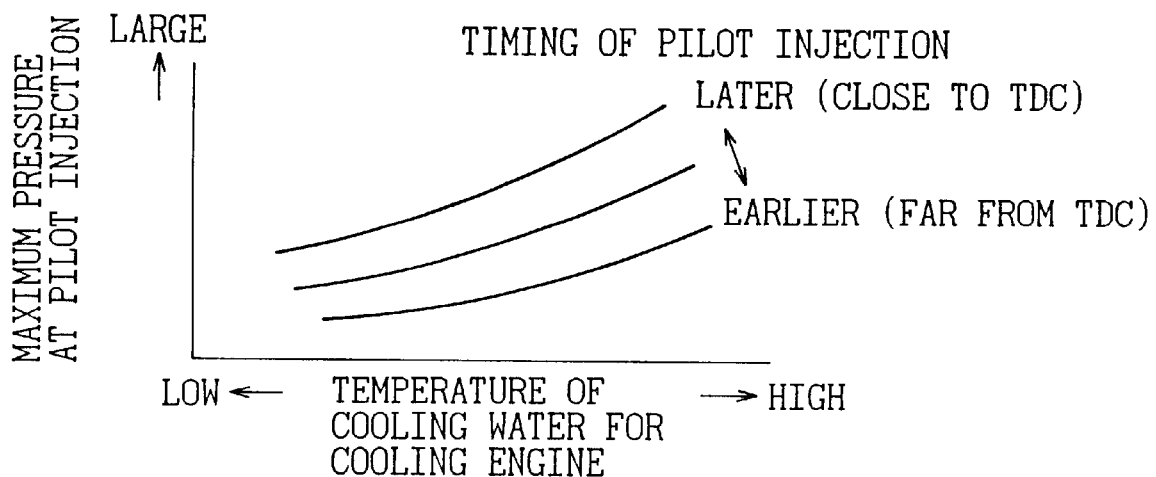
FIG. 24 is a map showing the relationship among the temperature of the cooling water, the maximum pressure of the fuel injected by the pilot injection, and the timing of the pilot injection according to the tenth embodiment.

The fuel injection control means of the ninth embodiment comprises a map shown in FIG. 24. According to the ninth embodiment, the pressure of the injection of the fuel at the pilot injection (hereinafter referred to as "pilot injection pressure") is controlled on the basis of the timing of the pilot injection and the temperature of the cooling water.

The higher the pilot injection pressure is, the larger the amount of the fuel injected by the pilot injection is. Therefore, the higher the pilot injection pressure is, the higher the temperature in the cylinder should be, to allow to burn the injected fuel. According to the map, the later the timing of the pilot injection is, the larger the pilot injection pressure is. Also, the higher the temperature of the cooling water of the engine is, the larger the pilot injection pressure is, to allow to burn the injected fuel. Therefore, according to the ninth embodiment, even when the pilot injection pressure is high, the temperature in the cylinder is high sufficient to allow to burn the injected fuel, and the area of the inner wall of the cylinder exposed to the injected fuel is small. Therefore, no injected fuel adheres to the inner wall of the cylinder.

Figure 25:
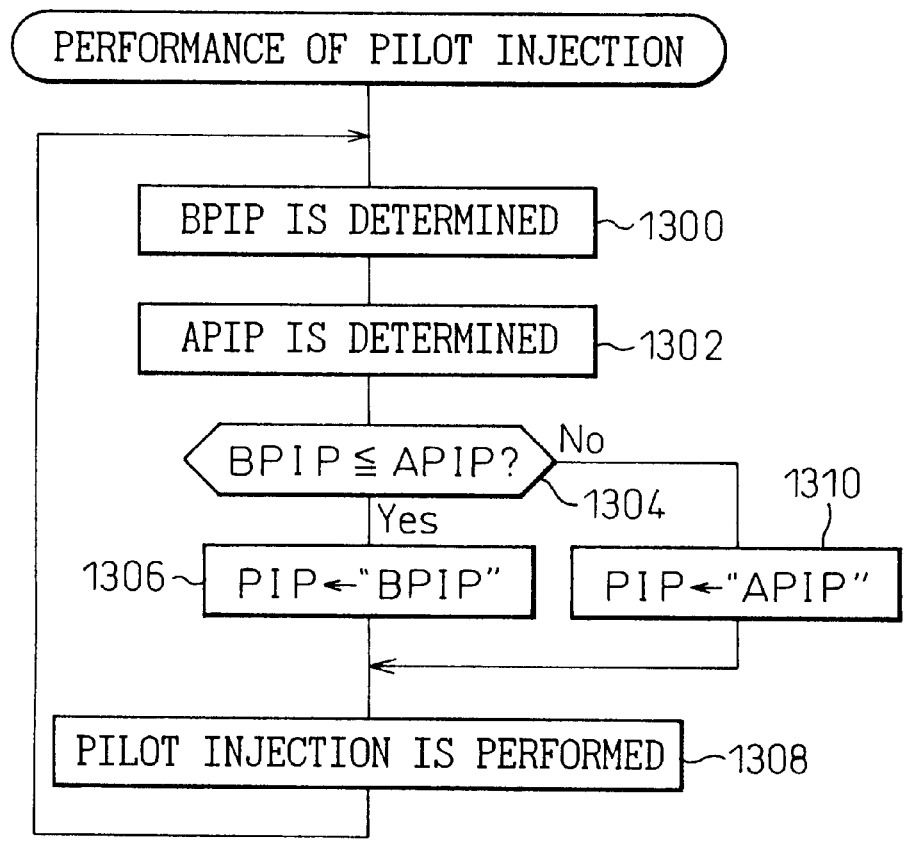
FIG. 25 is flowchart of the operation of the pilot injection according to the tenth embodiment.

The operation of the pilot injection according to the ninth embodiment will be explained in detail, by referring the flowchart in FIG. 25.

At step 1300, the basic pressure BPIP of the injection of the fuel at the pilot injection (hereinafter referred to as "basic pilot injection pressure") and the injection interval in the pilot injection mode are determined on the basis of the engine driving condition, and the routine proceeds to step 1302 where the allowable pressure APIP of the injection of the fuel at the pilot injection (hereinafter referred to as "allowable pilot injection pressure") is determined by reading the map on the basis of the temperature of the cooling water and the timing of the pilot injection, and the routine proceeds to step 1304.

At step 1304, it is judged if the basic pilot injection pressure BPIP is equal to or smaller than the allowable pilot injection pressure APIP (BPIP≦APIP). When BPIP≦APIP, the routine proceeds to step 1306 where BPIP is input into the predetermined pressure PIP of the injection of the fuel at the pilot injection (hereinafter referred to as "predetermined pilot injection pressure"), and the routine proceeds to step 1308 where the pilot injection is operated, and the routine is ended. On the other hand, when BPIP>APIP, the routine proceeds to step 1310 where APIP is input into the predetermined pilot injection pressure PIP, and the routine proceeds to step 1308 where the pilot injection is operated, and the routine is ended.

Figure 26:
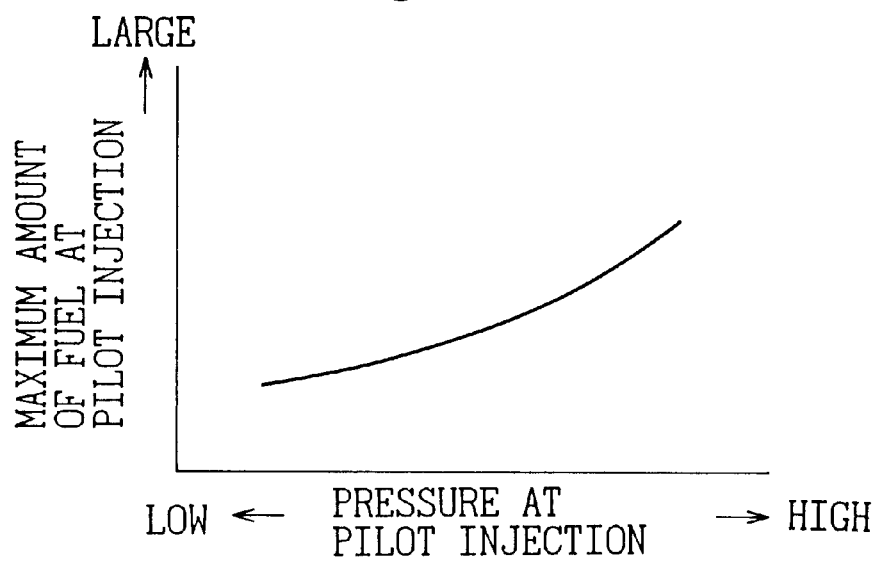
FIG. 26 is a map showing the relationship between the pressure of the fuel injected by the pilot injection and the maximum amount of the fuel injected by the pilot injection according to the tenth embodiment.

In the ninth embodiment, if the higher the pilot injection pressure is, the larger the amount of the fuel becoming mist is, the amount of the fuel to be injected by the pilot injection can be determined on the basis of the pilot injection pressure, according to a map shown in FIG. 26. In the map, the higher the pilot injection pressure is, the larger the maximum amount of the fuel to be injected by the pilot injection is.

However, the higher the pilot injection pressure is, the larger the inertia of the fuel injected by the pilot injection may be. Therefore, the higher the pilot injection pressure is, the larger the amount of the fuel adhering to the inner wall of the cylinder is. Thus, in this case, a map should be used, in which the higher the pilot injection pressure is, the smaller the maximum amount of the fuel to be injected by the pilot injection is.

Note that, if the pilot injection pressure is constant, the smaller the amount of the fuel injected by the pilot injection is, the larger the amount of the fuel becoming mist is.

An post injection according to the tenth embodiment will be explained below.

The CPU 86 has a second mode switching means therein. The second mode switching means selectively switches a normal injection mode to a post injection mode. In the normal injection mode, only the main injection is operated. On the other hand, in the post injection mode, the main and post injections are operated.

Figure 37:
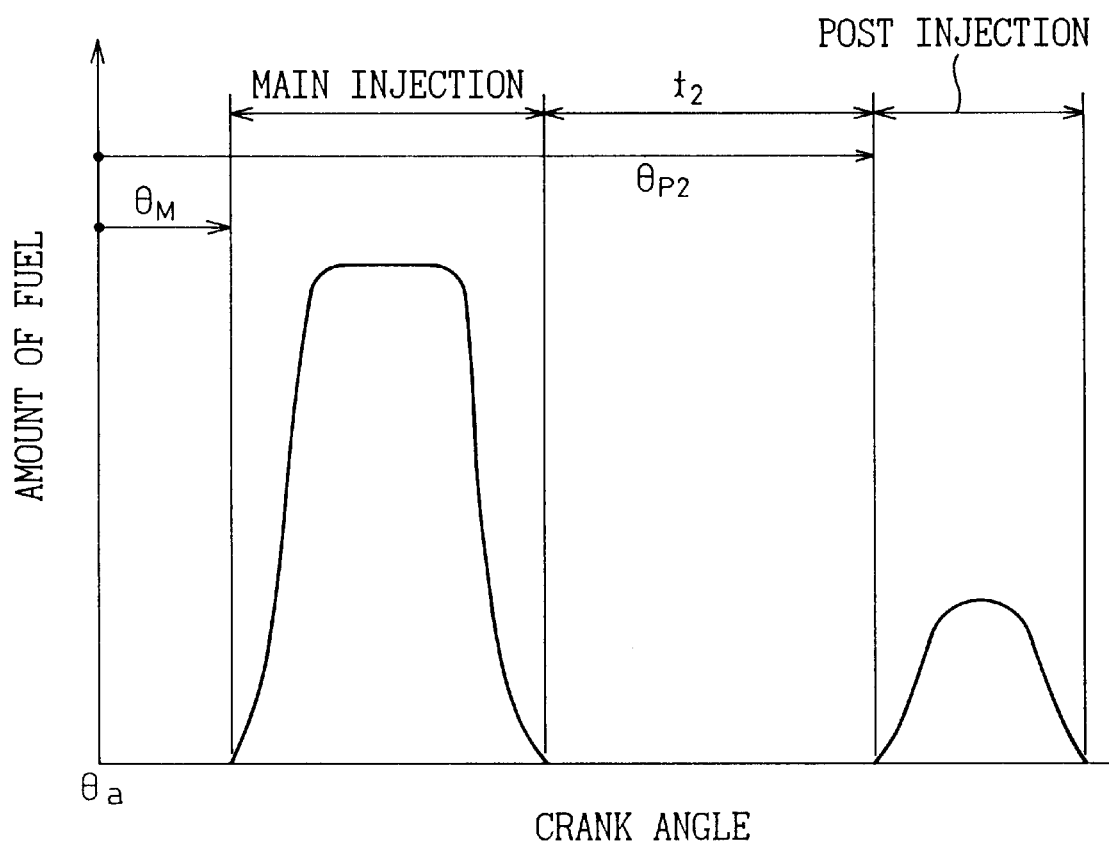
FIG. 37 is a view showing the relationship between the crank angle and the amount of the fuel injected by the main and post injections.

When the second mode switching means switches the normal injection mode to the post injection mode, and vice versa, as shown in FIG. 37, the fuel injection control means sets the interval of the operation of the main and post injections by calculating the timing θM to start the operation of the main injection, the timing to stop the operation of the main injection, the timing θ p2 to start the operation of the post injection, and the timing to stop the operation of the post injection from the predetermined basic crank angle ea on the basis of the present engine driving condition.

In the post injection mode, the interval of the operation of the main and post injections is set to a predetermined interval. On the other hand, in the normal injection mode, the interval of the operation of the main and post injections is set to zero.

Figure 27:
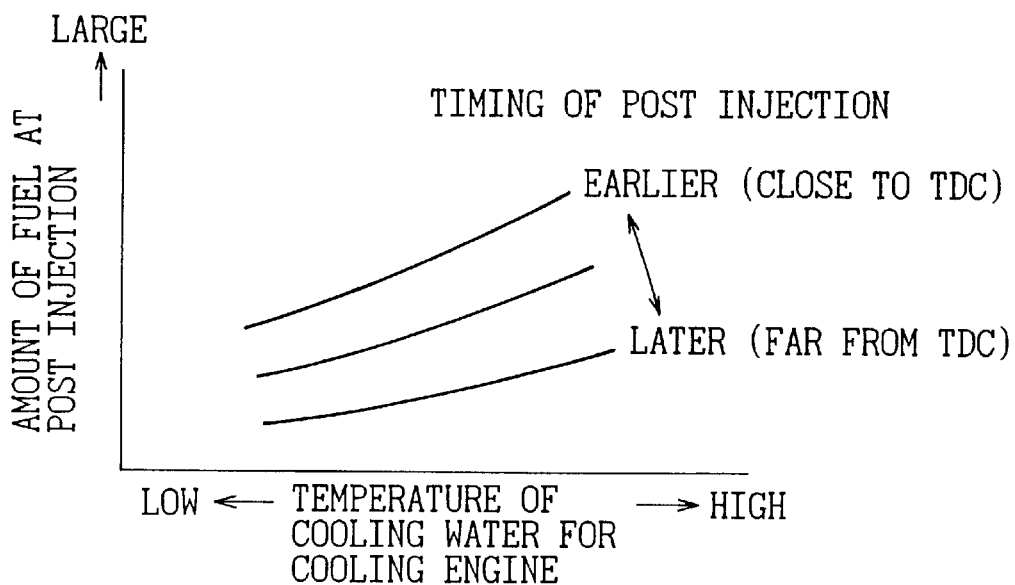
FIG. 27 is a map showing the relationship among the temperature of the cooling water, the amount of the fuel injected by the post injection, and the timing of the post injection according to the eleventh embodiment.

An operation of a post injection according to the tenth embodiment will be explained below. The injection control means of the tenth embodiment comprises a map shown in FIG. 27. According to the tenth embodiment, the timing of the fuel to be injected by the post injection is controlled on the basis of the temperature of the cooling water and the amount of the fuel to be injected by the post injection.

The larger the amount of the fuel to be injected by the post injection is, the smaller the amount of the fuel evaporated in the cylinder is. According to the map, the larger the amount of the fuel to be injected by the pilot injection is, the earlier the timing of the post injection is. The earlier the timing of the post injection is, the higher the temperature in the cylinder is. Therefore, according to the tenth embodiment, when the amount of the fuel injected by the post injection is large, the timing of the pilot injection is early to expose the injected fuel to the high temperature in the cylinder to allow to evaporate the injected fuel in the cylinder. Thus, an amount of the fuel adhering to the inner wall of the cylinder is kept small.

Further, the lower the temperature of the cooling water is, the smaller the amount of the fuel evaporated in the cylinder is. According to the map, the lower the temperature of the cooling water is, the earlier the timing of the pilot injection is. The earlier the timing of the post injection is, the higher the temperature in the cylinder is. Therefore, according to the seventh embodiment, when the temperature in the cylinder at the post injection is low, the timing of the post injection is early to expose the injected fuel to the high temperature in the cylinder to allow to evaporate the injected fuel in the cylinder. Thus, an amount of the fuel adhering to the inner wall of the cylinder is kept small.

Further, according to the seventh embodiment, when the temperature in the cylinder at the post injection is low, the timing of the post injection is earlier. Thus, the area of the inner wall of the cylinder exposed to the injected fuel is small so that an amount of the fuel adhering to the inner wall of the cylinder is kept further small.

Figure 28:
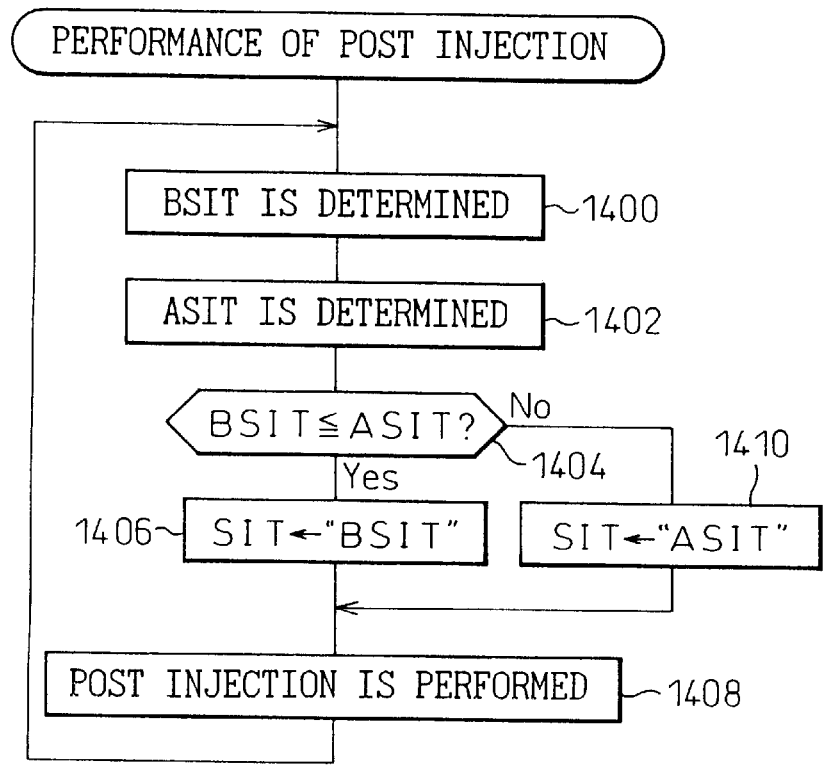
FIG. 28 is a flowchart of the operation of the post injection according to the eleventh embodiment.

The operation of the post injection according to the tenth embodiment will be explained in detail by referring the flowchart in FIG. 28.

At step 1400, the basic timing BSIT of the post injection and the injection interval in the post injection mode are determined on the basis of the engine driving condition, and the routine proceeds to step 1402 where the allowable timing ASIT of the post injection is determined by reading the map on the basis of the temperature of the cooling water and the amount of the fuel to be injected by the post injection, and the routine proceeds to step 1404.

At step 1404, it is judged if the basic timing BSIT of the post injection is equal to or smaller than the allowable timing ASIT of the post injection (BSIT≦ASIT). When BSIT≦ASIT, the routine proceeds to step 1406 where BSIT is input into the predetermined timing SIT of the post injection, and the routine proceeds to step 1408 where the post injection is operated, and the routine is ended. On the other hand, when BSIT>ASIT, the routine proceeds to step 1410 where ASIT is input into the predetermined timing SIT of the post injection, and the routine proceeds to step 1408 where the post injection is operated, and the routine is ended.

An operation of a post injection according to the eleventh embodiment will be explained below. The fuel injection control means of the eleventh embodiment comprises a same map as shown in FIG. 21. According to the eleventh embodiment, the amount of the fuel to be injected by the post injection is controlled on the basis of the timing of the post injection and the temperature of the cooling water.

The earlier the timing of the post injection is, the smaller the area of the inner wall of the cylinder exposed to the injected fuel is. Therefore, the earlier the timing of the post injection is, the larger the amount of the fuel to be injected by the post injection can be. Also, the earlier the timing of the post injection is, the higher the temperature in the cylinder is. Therefore, the earlier the timing of the post injection is, the larger the amount of the fuel to be injected by the the post injection can be. According to the map, the earlier the timing of the post injection is, the larger the maximum amount of the fuel to be injected by the post injection is. Therefore, according to the eighth embodiment, when the amount of the fuel to be injected by the post injection is large, the timing of the post injection is early. Thus, the area of the inner wall of the cylinder exposed to the injected fuel is small and the temperature in the cylinder exposed to the injected fuel is high so that an amount of the fuel adhering to the inner wall of the cylinder is kept small.

Further, the higher the temperature of the cooling water is, the larger the amount of the fuel to be injected by the the post injection can be. According to the map, the higher the temperature of the cooling water is, the larger the maximum amount of the fuel to be injected by the post injection is. Therefore, according to the eighth embodiment, the injected fuel can be exposed to the high temperature in the cylinder sufficient to allow to burn the injected fuel. Thus, no injected fuel adheres to the inner wall of the cylinder.

Figure 29:
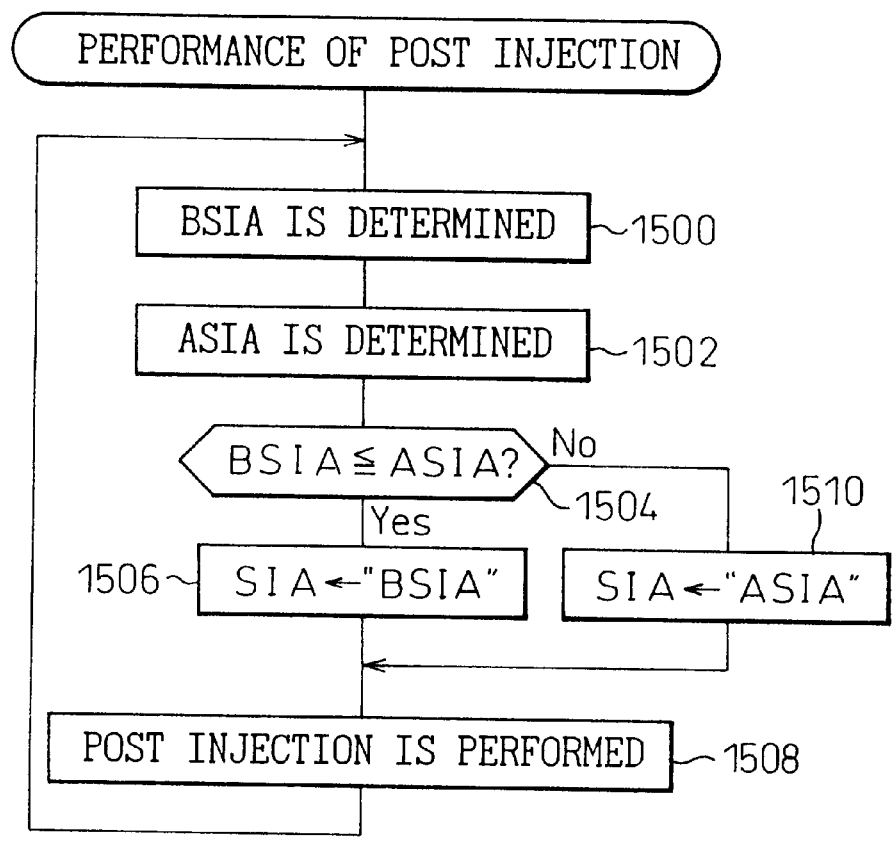
FIG. 29 is a flowchart of the operation of the post injection according to the twelfth embodiment.

The operation of the post injection according to the eleventh embodiment will be explained in detail by referring the flowchart in FIG. 29.

At step 1500, the basic amount BSIA of the fuel to be injected by the post injection and the injection interval in the post injection mode are determined on the basis of the engine driving condition, and the routine proceeds to step 1502 where the allowable amount ASIA of the fuel to be injected by the post injection is determined by reading the map on the basis of the temperature of the cooling water and the timing of the post injection, and the routine proceeds to step 1504.

At step 1504, it is judged if the basic amount BSIA is equal to or smaller than the allowable amount ASIA (BSIA≦ASIA). When BSIA≦ASIA, the routine proceeds to step 1506 where BSIA is input into the predetermined amount SIA of the fuel injected by the post injection, and the routine proceeds to step 1508 where the post injection is operated, and the routine is ended. On the other hand, when BSIA>ASIA, the routine proceeds to step 1510 where ASIA is input into the predetermined amount SIA, and the routine proceeds to step 1508 where the post injection is operated, and the routine is ended.

Figure 30:
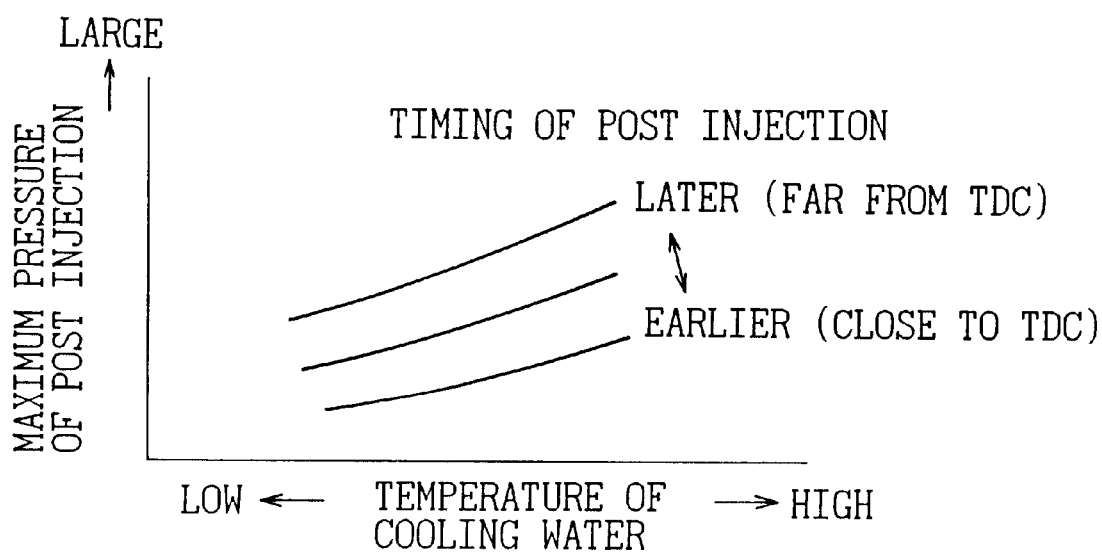
FIG. 30 is a map showing the relationship among the temperature of the cooling water, the maximum pressure of the fuel injected by the post injection, and the timing of the post injection according to the thirteenth embodiment.

An operation of a post injection according to the twelfth embodiment will be explained below. The fuel injection control means of the twelfth embodiment comprises a map shown in FIG. 30. According to the twelfth embodiment, the pressure of the injection of the fuel at the post injection (hereinafter referred to as "post injection pressure") is controlled on the basis of the timing of the post injection and the temperature of the cooling water.

The higher the post injection pressure is, the larger the amount of the fuel injected by the post injection is. Therefore, the higher the post injection pressure is, the higher the temperature in the cylinder should be, to allow to evaporate the injected fuel. According to the map, the later the timing of the post injection is, the larger the post injection pressure is. Also, the higher the temperature of the cooling water of the engine is, the larger the post injection pressure is, to allow to evaporate the injected fuel. Therefore, according to the ninth embodiment, even when the post injection pressure is high, the temperature in the cylinder is high sufficient to allow to evaporate the injected fuel, and the area of the inner wall of the cylinder exposed to the injected fuel is small. Therefore, no injected fuel adheres to the inner wall of the cylinder.

Figure 31:
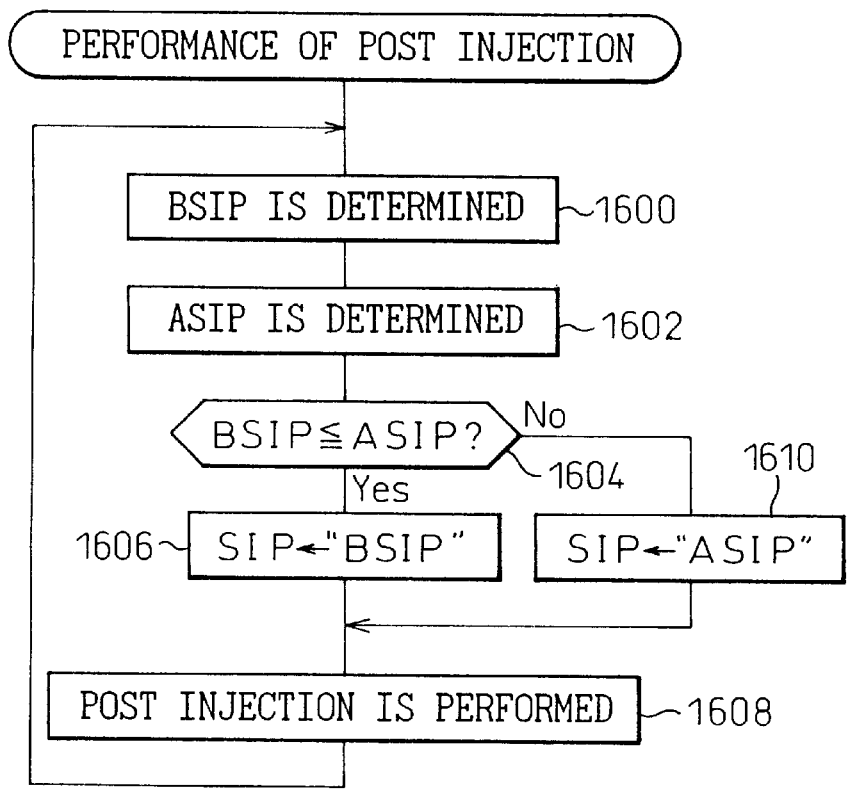
FIG. 31 is a flowchart of the operation of the post injection according to the thirteenth embodiment.

The operation of the post injection according to the twelfth embodiment will be explained in detail, by referring the flowchart in FIG. 31.

At step 1600, the basic pressure BSIP of the injection of the fuel at the post injection (hereinafter referred to as "basis post injection pressure") and the injection interval in the post injection mode are determined on the basis of the engine driving condition, and the routine proceeds to step 1602 where the allowable pressure ASIP of the injection of the fuel at the post injection (hereinafter referred to as "allowable post injection pressure") is determined by reading the map on the basis of the temperature of the cooling water and the timing of the post injection, and the routine proceeds to step 1604.

At step 1604, it is judged if the basic post injection pressure BSIP is equal to or smaller than the allowable post injection pressure ASIP (BSIP≦ASIP). When BSIP≦ASIP, the routine proceeds to step 1606 where BSIP is input into the predetermined pressure SIP of the injection of the fuel at the post injection (hereinafter referred to as "predetermined post injection pressure"), and the routine proceeds to step 1608 where the post injection is operated, and the routine is ended. On the other hand, when BSIP>ASIP, the routine proceeds to step 1610 where ASIP is input into the predetermined post injection pressure SIP, and the routine proceeds to step 1608 where the post injection is operated, and the routine is ended.

An operation of a pilot injection according to the thirteenth embodiment will be explained below.

The closer to the TDC the piston is, the higher the pressure in the cylinder is. Therefore, the higher the pressure in the cylinder is, the smaller the amount of the fuel adhering to the inner wall of the cylinder is. Thus the higher the pressure in the cylinder is, the larger the maximum amount of the fuel to be injected by the pilot injection is.

Figure 32:
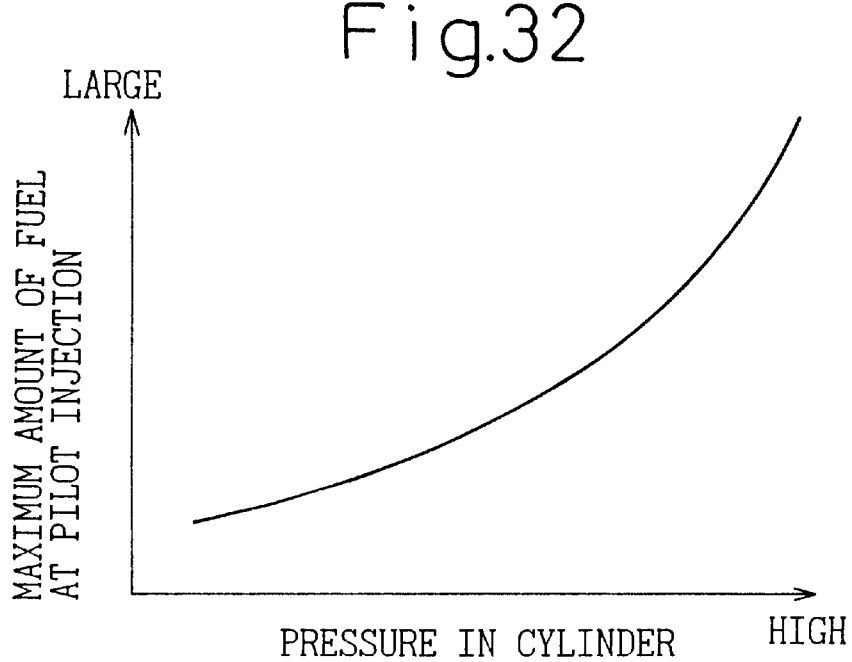
FIG. 32 is a map showing the relationship between the pressure in the cylinder and the maximum amount of the fuel injected by the pilot injection according to the fourteenth embodiment.

According to the thirteenth embodiment, the amount of the fuel to be injected by the pilot injection is controlled on the basis of the map shown in FIG. 32. In the map, the higher the pressure in the cylinder is, the larger the maximum amount of the fuel to be injected by the pilot injection is. Note that the pressure in the cylinder is a parameter associated with the timing of the pilot injection.

Figure 33:
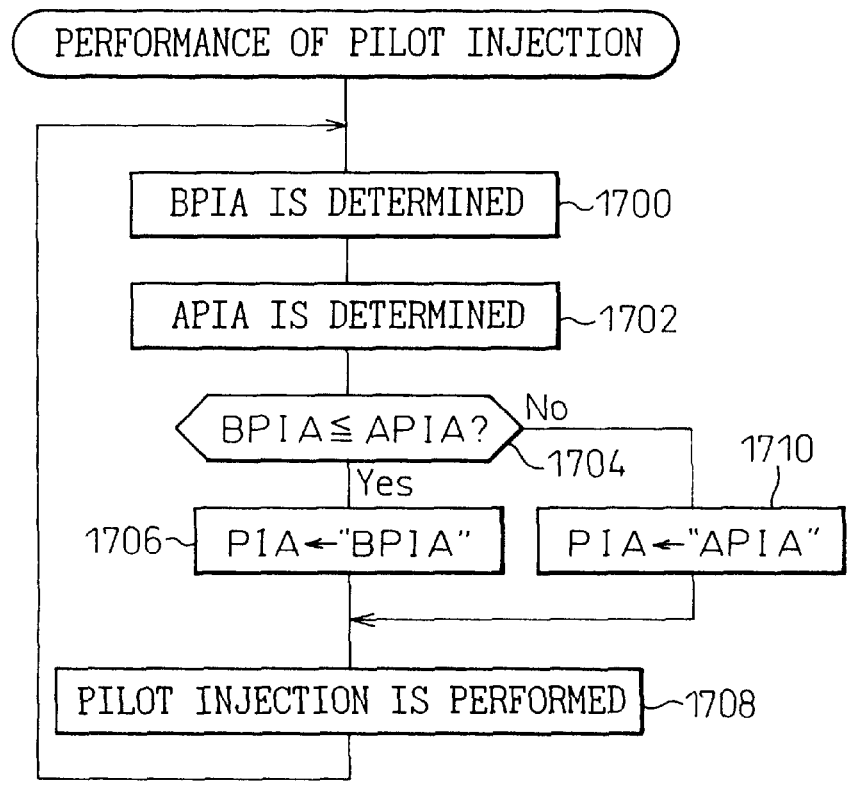
FIG. 33 is a flowchart of the operation of the pilot injection according to the fourteenth embodiment.

The operation of the pilot injection according to the thirteenth embodiment will be explained in detail, by referring the flowchart in FIG. 33.

At step 1700, the basic amount BPIA of the fuel to be injected by the pilot injection and the injection interval in the pilot injection mode are determined on the basis of the engine driving condition, and the routine proceeds to step 1702 where the allowable amount APIA of the fuel to be injected by the pilot injection is determined by reading the map on the basis of the pressure in the cylinder, and the routine proceeds to step 1704.

At step 1704, it is judged if the basic amount BPIA is equal to or smaller than the allowable amount APIA (BPIA≦APIA). When BPIA≦APIA, the routine proceeds to step 1706 where BPIA is input into the predetermined amount PIA of the fuel injected by the pilot injection, and the routine proceeds to step 1708 where the pilot injection is operated, and the routine is ended. On the other hand, when BPIA>APIA, the routine proceeds to step 1710 where APIA is input into the predetermined amount PIA, and the routine proceeds to step 1708 when the pilot injection is operated, and the routine is ended.

An operation of a pilot injection according to the fourteenth embodiment will be explained below.

The closer to the TDC the piston is, the higher the pressure in the cylinder is. Therefore, the higher the pressure in the cylinder is, the smaller the amount of the fuel adhering to the inner wall of the cylinder is. Thus, the higher the pressure in the cylinder is, the larger the maximum pressure of the injection of the fuel at the pilot injection (hereinafter referred to as "maximum pilot injection pressure") is.

Figure 34:
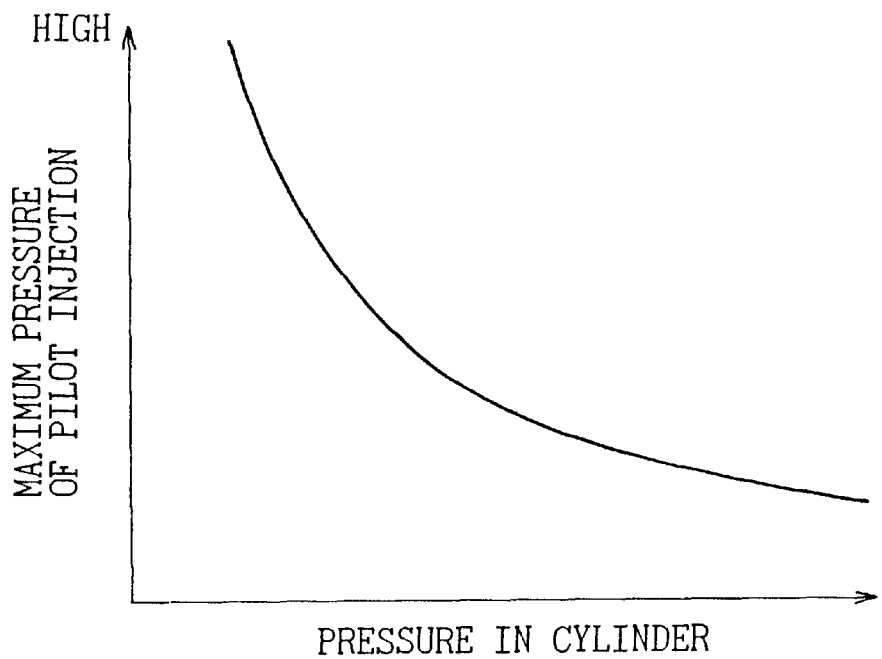
FIG. 34 is a map showing the relationship between the pressure in the cylinder and the maximum pressure of the fuel injected by the pilot injection according to the fifteenth embodiment.

According to the fourteenth embodiment, the pilot injection pressure is controlled on the basis of the map shown in FIG. 34. In the map, the higher the pressure in the cylinder is, the larger the maximum pilot injection pressure is.

Note that the concentration of the air in the cylinder, the crank angle as a parameter associated with the concentration of the air in the cylinder, or the differential pressure between the pressure of the fuel in the common rail and the pressure in the cylinder can be employed instead of the pressure in the cylinder. Further, note that the timing of the pilot injection can be employed instead of the pilot injection pressure.

Figure 35:
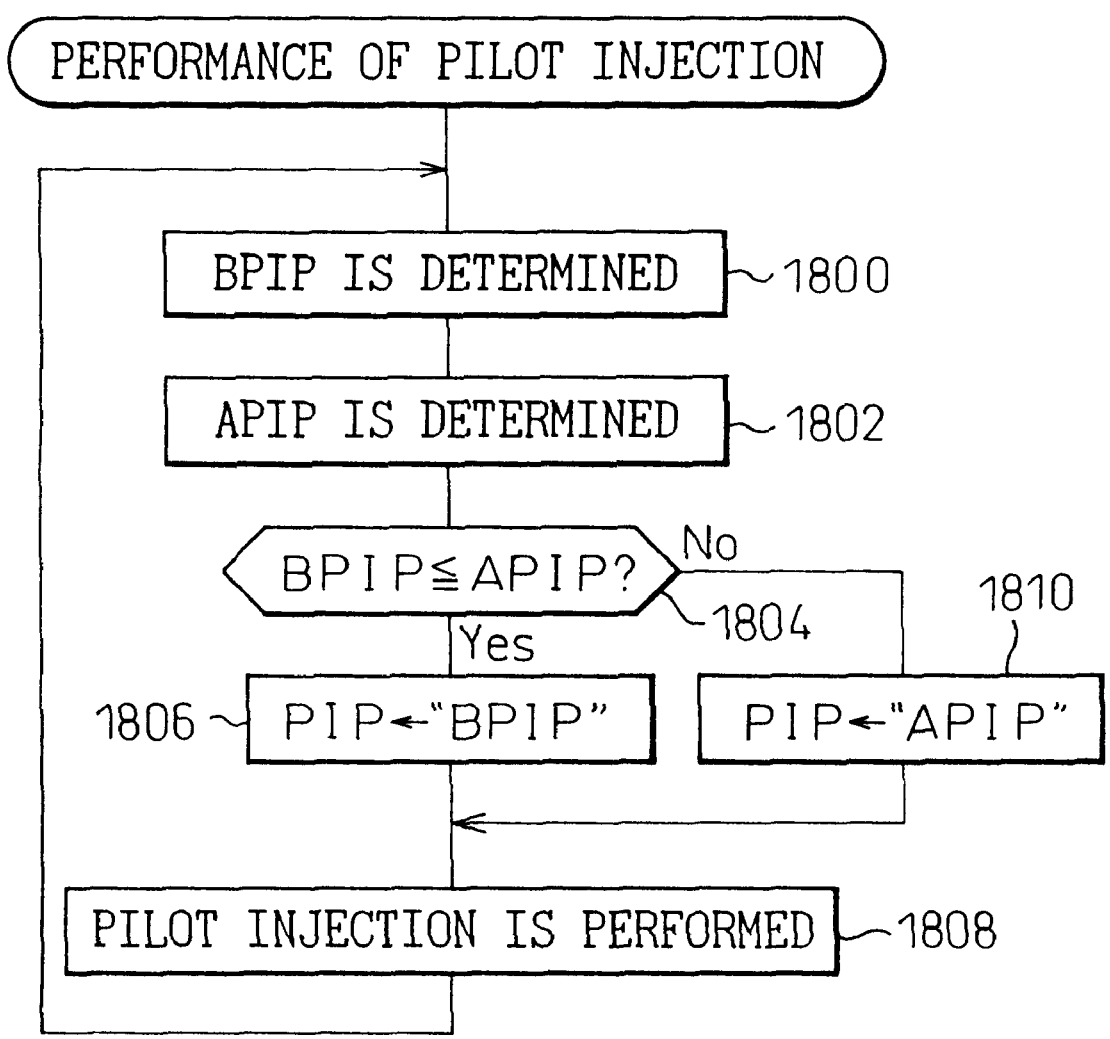
FIG. 35 is a flowchart of the operation of the pilot injection according to the fifteenth embodiment.

The operation of the pilot injection according to the fourteenth embodiment will be explained in detail, by referring the flowchart in FIG. 35.

At step 1800, the basic pilot injection pressure BPIP and the injection interval in the pilot injection mode are determined on the basis of the engine driving condition, and the routine proceeds to step 1802 where the allowable pilot injection pressure APIP is determined by reading the map on the basis of the pressure in the cylinder, and the routine proceeds to step 1804.

At step 1804, it is judged if the basic pilot injection pressure BPIP is equal to or smaller than the allowable pilot injection pressure APIP (BPIP≦APIP). When BPIP≦APIP, the routine proceeds to step 1806 where BPIP is input into the predetermined pilot injection pressure PIP, and the routine proceeds to step 1808 where the pilot injection is operated, and the routine is ended. On the other hand, when BPIP>APIP, the routine proceeds to step 1810 where APIP is input into the predetermined pilot injection pressure PIP, and the routine proceeds to step 1808 where the pilot injection is operated, and the routine is ended.

In the above embodiment, HC injected by the post injection is used to purify $NO_X$ in the $NO_X$ catalyst. However, when the temperature of the catalyst is lower than a minimum temperature of a predetermined range of the temperature in which the $NO_X$ catalyst can purify $NO_X$, HC injected by the post injection can be used to increase the temperature of the $NO_X$ catalyst such that the temperature of the $NO_X$ catalyst is within the predetermined range of the temperature. In this case, HC is burned in the cylinder to increase the temperature of the exhaust gas, resulting in increasing the temperature of the $NO_X$ catalyst.

Further, the temperature in the cylinder is lower than the predetermined temperature when the injection interval between the timings of the main and post injections are longer than a predetermined interval since the longer the time elapsing from the performance of the main injection is, the lower the temperature in the cylinder becomes. Therefore, it can be judged that the temperature in the cylinder is higher than the predetermined temperature when the injection interval is shorter than the predetermined interval, and the post injection can be performed.

Further, in the above embodiment, the temperature of the air in the cylinder can be calculated on the basis of the temperature of the exhaust gas.

Further, the injector may be directed such that the direction of the fuel injected by the pilot or post injection is directed toward a center of the top face of the piston when it is judged that the ratio of the area of the top face of the piston relative to the area of the inner wall of the cylinder becomes smaller than a predetermined ratio. Note that the amount of the fuel adhering to the inner wall of the cylinder becomes larger when the ratio of the area of the top face of the piston relative to the area of the inner wall of the cylinder becomes smaller than the predetermined ratio.

While the invention has been described by reference to specific embodiments chosen for purposes of illustration, it should be apparent that numerous modifications can be made thereto by those skilled in the art without departing from the basic concept and scope of the invention.

We claim:

1. A fuel injecting device for injecting fuel into a cylinder of an engine, comprising:

fuel injecting means for injecting a main fuel charge into said cylinder at a predetermined first timing, and said fuel injecting means injects additional fuel into said cylinder at a predetermined second timing which is different from said predetermined first timing;

judging means for judging if an amount of fuel adhering to an inner wall of said cylinder is larger than a predetermined fuel amount when said fuel injecting means injects said additional fuel; and control means for controlling an operation of said fuel injecting means to inject said additional fuel such that an amount of fuel adhering to said inner wall of said cylinder becomes smaller than said predetermined fuel amount when said judging means judges that an amount of fuel adhering to said inner wall of said cylinder is larger than said predetermined fuel amount.

2. A fuel injecting device according to claim 1, wherein said predetermined second timing is earlier than said predetermined first timing.

3. A fuel injecting device according to claim 1, wherein said predetermined second timing is later than said predetermined first timing, and a catalyst for purifying exhaust gas discharged from said cylinder with the fuel is provided in an exhaust passage.

4. A fuel injecting device according to claim 3, wherein said additional fuel is burned to increase the temperature of said catalyst.

5. A fuel injecting device according to claim 3, wherein said catalyst purifies the exhaust gas with said additional fuel when said exhaust gas includes excess oxygen therein.

6. A fuel injecting device according to claim 1, wherein said judging means judges that an amount of fuel adhering to said inner wall of said cylinder is larger than said predetermined fuel amount when said judging means judges that an amount of the fuel evaporating from said inner wall of said cylinder is smaller than a predetermined fuel evaporating amount.

7. A fuel injecting device according to claim 6, wherein said judging means judges that an amount of the fuel evaporating from said inner wall of said cylinder is smaller than said predetermined fuel evaporating amount when said judging means judges that the temperature of said inner wall of said cylinder is lower than a predetermined inner wall temperature.

8. A fuel injecting device according to claim 6, wherein said judging means judges that an amount of the fuel evaporating from said inner wall of said cylinder is smaller than said predetermined fuel evaporating amount when said judging means judges that an amount of said main fuel charge is smaller than a predetermined main fuel charge amount.

9. A fuel injecting device according to claim 1, wherein said judging means judges that an amount of fuel adhering to said inner wall of said cylinder is larger than said predetermined fuel amount when said judging means judges that an amount of the fuel evaporating when said additional fuel flows into said cylinder is smaller than a predetermined fuel evaporating amount.

10. A fuel injecting device according to claim 9, wherein said judging means judges that an amount of the fuel evaporating when said additional fuel flows into said cylinder is smaller than said predetermined fuel evaporating amount when said judging means judges that the pressure of the injection of said additional fuel is lower than a predetermined injection pressure.

11. A fuel injecting device according to claim 9, wherein said judging means judges that an amount of the fuel evaporating, when said additional fuel flows into said cylinder, is smaller than said predetermined fuel evaporating amount when said judging means judges that the pressure of the injection of said additional fuel is higher than a predetermined injection pressure and the amount of said additional fuel is larger than a predetermined additional fuel amount.

12. A fuel injecting device according to claim 9, wherein said judging means judges that an amount of the fuel evaporating, when said additional fuel flows into said cylinder, is smaller than said predetermined fuel evaporating amount when said judging means judges that the temperature of an air in said cylinder is lower than a predetermined air temperature.

13. A fuel injecting device according to claim 12, wherein said judging means judges that the temperature of said air in said cylinder is lower than said predetermined air temperature when said judging means judges that the temperature of an intake air introduced into said cylinder is lower than a predetermined intake air temperature.

14. A fuel injecting device according to claim 12, wherein said judging means judges that the temperature of said air in said cylinder is lower than said predetermined air temperature when said judging means judges that the temperature of an exhaust gas discharged from said cylinder is lower than a predetermined exhaust gas temperature.

15. A fuel injecting device according to claim 12, wherein said judging means judges that the temperature of said air in said cylinder is lower than said predetermined air temperature when said judging means judges that an interval between said predetermined first and second timings is longer than a predetermined interval.

16. A fuel injecting device according to claim 9, wherein said judging means judges that an amount of the fuel evaporating, when said additional fuel flows into said cylinder, is smaller than said predetermined fuel evaporating amount when said judging means judges that the pressure in said cylinder is higher than a predetermined pressure.

17. A fuel injecting device according to claim 1, wherein a piston is inserted in said cylinder, and said judging means judges that an amount of fuel adhering to said inner wall of said cylinder is larger than said predetermined fuel amount when said judging means judges that a ratio of an area of a top face of said piston relative to an area of said inner wall within range of the injection of said additional fuel is smaller than a predetermined ratio.

18. A fuel injecting device according to claim 17, wherein said ratio of said area of said top face of said piston relative to said area of said inner wall becomes large as said piston becomes close to a top dead center of a compression stroke of said engine.

19. A fuel injecting device according to claim 1, wherein said judging means judges that an amount of fuel adhering to said inner wall of said cylinder is larger than said predetermined fuel amount when said judging means judges that an amount of said additional fuel is larger than a predetermined additional fuel amount.

20. A fuel injecting device according to claim 1, wherein said control means increases an amount of the fuel evaporating when said fuel flows into said cylinder to a predetermined evaporating fuel amount when said judging means judges that an amount of fuel adhering to said inner wall of said cylinder is larger than said predetermined fuel amount.

21. A fuel injecting device according to claim 20, wherein said control means increases an amount of the fuel evaporating when said fuel flows into said cylinder to said predetermined evaporating fuel amount by controlling the pressure of the injection of said additional fuel at said predetermined second timing.

22. A fuel injecting device according to claim 1, wherein a piston is inserted in said cylinder, said control means increases a ratio of an area of a top face of said piston relative to an area of said inner wall of said cylinder within range of the injection of said additional fuel to a predetermined ratio when said judging means judges that an amount of the fuel adhering to said inner wall of said cylinder is larger than said predetermined fuel amount.

23. A fuel injecting device according to claim 22, wherein said control means increases said ratio of said area of said top face of said piston relative to said area of said inner wall of said cylinder by injecting said additional fuel when said piston becomes close to a top dead center of a compression stroke of said engine.

24. A fuel injecting device according to claim 22, wherein said control means directs a direction of said additional fuel toward a center of said top face of said piston when said judging means judges that said ratio of said area of said top face of said piston relative to said area of said inner wall of said cylinder becomes smaller than said predetermined ratio.

25. A fuel injecting device according to claim 1, wherein said control means decreases an amount of said additional fuel when said judging means judges that an amount of fuel adhering to said inner wall of said cylinder is larger than said predetermined fuel amount.

26. A fuel injecting device according to claim 25, wherein said engine comprises a plurality of cylinders, an exhaust gas recirculating passage for recirculating an exhaust gas from at least one of said cylinders into an intake passage of said engine, and a shutting valve for shutting said exhaust gas recirculating passage, and when said control means judges that an amount of the fuel adhering to said inner wall of said cylinder is larger than said predetermined fuel amount, said control means closes said shutting valve and controls the operation of said fuel injecting means to inject a part of said additional of fuel at said predetermined second timing of each cylinder.

27. A fuel injecting device according to claim 1, wherein said control means stops injecting said additional fuel when said judging means judges that an amount of fuel adhering to said inner wall of said cylinder is larger than said predetermined fuel amount.

* * * * *